United States Patent
He et al.

(10) Patent No.: US 11,540,166 B2
(45) Date of Patent: Dec. 27, 2022

(54) PROCEDURES FOR MANAGING QUALITY OF SERVICE FLOWS

(71) Applicant: QUALCOMM Incorporated, San Diego, CA (US)

(72) Inventors: Linhai He, San Diego, CA (US); Sitaramanjaneyulu Kanamarlapudi, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/085,333

(22) Filed: Oct. 30, 2020

(65) Prior Publication Data

US 2021/0176659 A1 Jun. 10, 2021

Related U.S. Application Data

(60) Provisional application No. 62/943,900, filed on Dec. 5, 2019.

(51) Int. Cl.
*H04W 28/02* (2009.01)
*H04W 72/14* (2009.01)
(Continued)

(52) U.S. Cl.
CPC ... *H04W 28/0268* (2013.01); *H04W 28/0257* (2013.01); *H04W 28/0273* (2013.01);
(Continued)

(58) Field of Classification Search
CPC ......... H04W 28/0257; H04W 28/0268; H04W 28/0273; H04W 28/0278; H04W 28/22;
(Continued)

(56) References Cited

U.S. PATENT DOCUMENTS

| 11,218,969 B2 * | 1/2022 | Nam | H04W 52/0248 |
| 2011/0261747 A1 * | 10/2011 | Wang | H04W 16/26 |
| | | | 370/315 |

(Continued)

FOREIGN PATENT DOCUMENTS

| WO | WO-2011123549 A1 | 10/2011 |
| WO | WO-2018175303 A1 | 9/2018 |
| WO | WO-2019032667 A1 | 2/2019 |

OTHER PUBLICATIONS

International Search Report and Written Opinion—PCT/US2020/058583—ISA/EPO—dated Feb. 11, 2021.
(Continued)

*Primary Examiner* — Nathan S Taylor
(74) *Attorney, Agent, or Firm* — Yanling Yang

(57) ABSTRACT

Methods, systems, and devices for wireless communications are described. A user equipment (UE) may determine that uplink data associated with a first quality of service flow is available for transmission to a base station. The UE may transmit a buffer status report to the base station. In some examples, the buffer status report may include a buffer status of the first quality of service flow. The UE may then receive an uplink grant based on transmitting the buffer status report, and may transmit the uplink data based on the uplink grant.

30 Claims, 16 Drawing Sheets

(51) Int. Cl.
H04W 28/22 (2009.01)
H04W 80/02 (2009.01)

(52) U.S. Cl.
CPC ....... *H04W 28/0278* (2013.01); *H04W 28/22* (2013.01); *H04W 72/14* (2013.01); *H04W 80/02* (2013.01)

(58) Field of Classification Search
CPC . H04W 72/14; H04W 80/02; H04W 72/1284; H04W 72/1236; H04W 72/1242; H04W 72/12; H04W 28/02
See application file for complete search history.

(56) References Cited

U.S. PATENT DOCUMENTS

| | | | | |
|---|---|---|---|---|
| 2015/0139080 | A1* | 5/2015 | Ellenbeck | H04L 1/00 370/329 |
| 2018/0317123 | A1* | 11/2018 | Chen | H04W 72/0413 |
| 2019/0053250 | A1* | 2/2019 | He | H04W 72/10 |
| 2019/0053260 | A1* | 2/2019 | Shaheen | H04W 28/0278 |
| 2019/0166640 | A1* | 5/2019 | Wei | H04W 76/14 |
| 2020/0068600 | A1* | 2/2020 | Yu | H04W 72/1268 |
| 2020/0092891 | A1* | 3/2020 | Gerkis | H04W 88/08 |
| 2020/0229198 | A1* | 7/2020 | Kung | H04W 72/042 |
| 2020/0260377 | A1* | 8/2020 | Jin | H04W 72/0446 |
| 2021/0058951 | A1* | 2/2021 | Pelletier | H04W 72/1268 |
| 2021/0144712 | A1* | 5/2021 | Jiang | H04W 72/1284 |
| 2021/0219168 | A1* | 7/2021 | Liu | H04W 40/22 |
| 2021/0243795 | A1* | 8/2021 | Kuo | H04W 72/14 |
| 2021/0266953 | A1* | 8/2021 | Pelletier | H04W 72/1289 |
| 2021/0345371 | A1* | 11/2021 | Li | H04W 72/1284 |
| 2022/0095366 | A1* | 3/2022 | Lee | H04W 72/1289 |
| 2022/0116959 | A1* | 4/2022 | Li | H04W 72/1252 |

OTHER PUBLICATIONS

ZTE: "Consideration on the Triggering of BSR", 3GPP TSG-RANWG2 Meeting #98, 3GPP Draft; R2-1704664 Consideration on the Triggering of BSR, 3rd Generation Partnership Project (3GPP), Mobile Competence Centre, 650, Route Des Lucioles, F-06921 Sophia-Antipolis Cedex, France, vol. RAN WG2, No. Hangzhou, China; May 15, 2017-May 19, 2017, May 14, 2017 (May 14, 2017), 3 Pages, XP051275209, Retrieved from the Internet: URL: http://www.3gpp.org/ftp/Meetings_3GPP_SYNC/RAN2/Docs/ [retrieved on May 14, 2017] the whole document.

* cited by examiner

PROCEDURES FOR MANAGING QUALITY OF SERVICE FLOWS

CROSS REFERENCE

The present application for patent claims the benefit of U.S. Provisional Patent Application No. 62/943,900 by HE et al., entitled "PROCEDURES FOR MANAGING QUALITY OF SERVICE FLOWS," filed Dec. 5, 2019, assigned to the assignee hereof, and expressly incorporated herein.

BACKGROUND

The following relates generally to wireless communications, and more specifically to procedures for managing quality of service flows.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE). Current wireless communications systems provide for buffer status reporting tied to logical channels.

SUMMARY

The described techniques relate to improved methods, systems, devices, and apparatuses that support procedures for managing quality of service flows. Generally, the described techniques provide for techniques to indicate buffer status on a quality of service flow basis. In some examples, a user equipment (UE) may determine that uplink data associated with a first quality of service flow is available for transmission to a base station. Upon determining the availability of uplink data, the UE may evaluate multiple conditions. The UE may transmit a buffer status report to the base station upon determining that at least one of the one or more conditions is satisfied. In some instances, the one or more conditions may be associated with one or more of a buffer including the uplink data, a timer associated with a prior buffer status report, or a combination thereof. In some cases, the UE may transmit a buffer status report including a buffer status of the first quality of service flow. Upon transmitting the buffer status report, the UE may receive an uplink grant from the base station. In some cases, the UE may transmit the uplink data based on receiving the uplink grant.

A method of wireless communication at a UE is described. The method may include determining that uplink data associated with a first quality of service flow is available for transmission to a base station, transmitting, to the base station, a buffer status report including a buffer status of the first quality of service flow, receiving, from the base station, an uplink grant based on transmitting the buffer status report, and transmitting the uplink data based on the uplink grant.

An apparatus for wireless communication at a UE is described. The apparatus may include a processor, memory coupled with the processor, and instructions stored in the memory. The instructions may be executable by the processor to cause the apparatus to determine that uplink data associated with a first quality of service flow is available for transmission to a base station, transmit, to the base station, a buffer status report including a buffer status of the first quality of service flow, receive, from the base station, an uplink grant based on transmitting the buffer status report, and transmit the uplink data based on the uplink grant.

Another apparatus for wireless communication at a UE is described. The apparatus may include means for determining that uplink data associated with a first quality of service flow is available for transmission to a base station, transmitting, to the base station, a buffer status report including a buffer status of the first quality of service flow, receiving, from the base station, an uplink grant based on transmitting the buffer status report, and transmitting the uplink data based on the uplink grant.

A non-transitory computer-readable medium storing code for wireless communication at a UE is described. The code may include instructions executable by a processor to determine that uplink data associated with a first quality of service flow is available for transmission to a base station, transmit, to the base station, a buffer status report including a buffer status of the first quality of service flow, receive, from the base station, an uplink grant based on transmitting the buffer status report, and transmit the uplink data based on the uplink grant.

Some examples of the method, apparatuses, and non-transitory computer-readable medium described herein may further include operations, features, means, or instructions for determining that the first quality of service may be associated with a buffer that may be empty other than the determined uplink data, where the first quality of service flow may be associated with a first logical channel priority, and determining a second logical channel priority associated with a second quality of service flow, where transmitting the buffer status report including the buffer status of the first quality of service flow may be based on a comparison of the first logical channel priority with the second logical channel priority.

In some examples of the method, apparatuses, and non-transitory computer-readable medium described herein, the second quality of service flow includes buffered data. Some examples of the method, apparatuses, and non-transitory computer-readable medium described herein may further include operations, features, means, or instructions for determining that a second quality of service flow may be devoid of buffered data, where transmitting the buffer status report including the buffer status of the first quality of service flow may be based on the determining.

Some examples of the method, apparatuses, and non-transitory computer-readable medium described herein may further include operations, features, means, or instructions for determining that a timer may have elapsed since transmission of a prior buffer status report, where transmitting the buffer status report including the buffer status of the first quality of service flow may be based on the determining. Some examples of the method, apparatuses, and non-transitory computer-readable medium described herein may further include operations, features, means, or instructions for determining that the first quality of service flow associated with the uplink data satisfies one or more thresholds, where transmitting the buffer status report including the buffer status of the first quality of service flow may be based on the determining.

Some examples of the method, apparatuses, and non-transitory computer-readable medium described herein may further include operations, features, means, or instructions for determining that at least a portion of the uplink data may have been buffered for more than a threshold time period, and transmitting the buffer status report including the buffer status of the first quality of service flow based on determining that at least the portion of the uplink data may have been buffered. In some examples of the method, apparatuses, and non-transitory computer-readable medium described herein, the first quality of service flow may be associated with a delay requirement.

Some examples of the method, apparatuses, and non-transitory computer-readable medium described herein may further include operations, features, means, or instructions for determining, based on a moving-average, a bit rate associated with the first quality of service flow, determining that a difference between the calculated bit rate and a predetermined bit rate satisfies a threshold bit rate, and transmitting the buffer status report including the buffer status of the first quality of service flow based on determining that the difference satisfies the threshold.

Some examples of the method, apparatuses, and non-transitory computer-readable medium described herein may further include operations, features, means, or instructions for determining, for a number of consecutive measurement intervals and based on a moving-average, a bit rate associated with the first quality of service flow, determining, for each of the number of consecutive measurement intervals, that a difference between the calculated bit rate and a predetermined bit rate satisfies a threshold bit rate, and transmitting the buffer status report including the buffer status of the first quality of service flow based on determining that the difference satisfies the threshold for each of the number of consecutive measurement intervals.

Some examples of the method, apparatuses, and non-transitory computer-readable medium described herein may further include operations, features, means, or instructions for receiving, from the base station, a signal indicating the one or more thresholds for triggering the buffer status report. In some examples of the method, apparatuses, and non-transitory computer-readable medium described herein, the signal indicating one or more thresholds includes at least one of a medium access control (MAC) control element, a radio resource control message, or a service data adaptation protocol data unit.

Some examples of the method, apparatuses, and non-transitory computer-readable medium described herein may further include operations, features, means, or instructions for determining that the first quality of service flow associated with the uplink data satisfies a threshold, and remapping the first quality of service flow to a logical channel based on the determining.

Some examples of the method, apparatuses, and non-transitory computer-readable medium described herein may further include operations, features, means, or instructions for determining that at least a portion of the uplink data may have been buffered for more than a threshold time period, and remapping the first quality of service flow to the logical channel based on determining that at least the portion of the uplink data may have been buffered.

Some examples of the method, apparatuses, and non-transitory computer-readable medium described herein may further include operations, features, means, or instructions for determining, based on a moving-average, a bit rate associated with the first quality of service flow, determining that a difference between the calculated bit rate and a predetermined bit rate satisfies a threshold bit rate, and remapping the first quality of service flow to the logical channel based on determining that the difference satisfies the threshold.

Some examples of the method, apparatuses, and non-transitory computer-readable medium described herein may further include operations, features, means, or instructions for determining, for a number of consecutive measurement intervals and based on a moving-average, a bit rate associated with the first quality of service flow, determining, for each of the number of consecutive measurement intervals, that a difference between the calculated bit rate and a predetermined bit rate satisfies a threshold bit rate, and remapping the first quality of service flow to the logical channel based on determining that the difference satisfies the threshold for each of the number of consecutive measurement intervals.

A method of wireless communication at a base station is described. The method may include receiving, from a UE, a buffer status report including a buffer status of a first quality of service flow associated with uplink data available for transmission at the UE, transmitting, to the UE, an uplink grant based on receiving the buffer status report, and receiving the uplink data based on the uplink grant.

An apparatus for wireless communication at a base station is described. The apparatus may include a processor, memory coupled with the processor, and instructions stored in the memory. The instructions may be executable by the processor to cause the apparatus to receive, from a UE, a buffer status report including a buffer status of a first quality of service flow associated with uplink data available for transmission at the UE, transmit, to the UE, an uplink grant based on receiving the buffer status report, and receive the uplink data based on the uplink grant.

Another apparatus for wireless communication at a base station is described. The apparatus may include means for receiving, from a UE, a buffer status report including a buffer status of a first quality of service flow associated with uplink data available for transmission at the UE, transmitting, to the UE, an uplink grant based on receiving the buffer status report, and receiving the uplink data based on the uplink grant.

A non-transitory computer-readable medium storing code for wireless communication at a base station is described. The code may include instructions executable by a processor to receive, from a UE, a buffer status report including a buffer status of a first quality of service flow associated with uplink data available for transmission at the UE, transmit, to the UE, an uplink grant based on receiving the buffer status report, and receive the uplink data based on the uplink grant.

Some examples of the method, apparatuses, and non-transitory computer-readable medium described herein may further include operations, features, means, or instructions for configuring the UE to determine that the first quality of service may be associated with a buffer that may be empty other than the determined uplink data, where the first quality of service flow may be associated with a first logical channel priority, configuring the UE to determine a second logical channel priority associated with a second quality of service flow, and configuring the UE to transmit the buffer status report based on a comparison of the first logical channel priority with the second logical channel priority. In some examples of the method, apparatuses, and non-transitory computer-readable medium described herein, the second quality of service flow includes buffered data.

Some examples of the method, apparatuses, and non-transitory computer-readable medium described herein may further include operations, features, means, or instructions for configuring the UE to transmit the buffer status report including the buffer status of the first quality of service flow may be based on determining that a second quality of service flow may be devoid of buffered data.

Some examples of the method, apparatuses, and non-transitory computer-readable medium described herein may further include operations, features, means, or instructions for configuring the UE to transmit the buffer status report including the buffer status of the first quality of service flow may be based on determining that that a timer may have elapsed since transmission of a prior buffer status report.

Some examples of the method, apparatuses, and non-transitory computer-readable medium described herein may further include operations, features, means, or instructions for configuring the UE to transmit the buffer status report including the buffer status of the first quality of service flow may be based on the determining that the first quality of service flow associated with the uplink data satisfies one or more thresholds. Some examples of the method, apparatuses, and non-transitory computer-readable medium described herein may further include operations, features, means, or instructions for transmitting, to the UE, a signal indicating the one or more thresholds for triggering the buffer status report.

In some examples of the method, apparatuses, and non-transitory computer-readable medium described herein, the signal indicating one or more thresholds includes at least one of a MAC control element, a radio resource control message, or a service data adaptation protocol data unit. Some examples of the method, apparatuses, and non-transitory computer-readable medium described herein may further include operations, features, means, or instructions for configuring the UE to remap the first quality of service flow to a logical channel based on the determining that the first quality of service flow associated with the uplink data satisfies a threshold.

DETAILED DESCRIPTION

Figure 1:
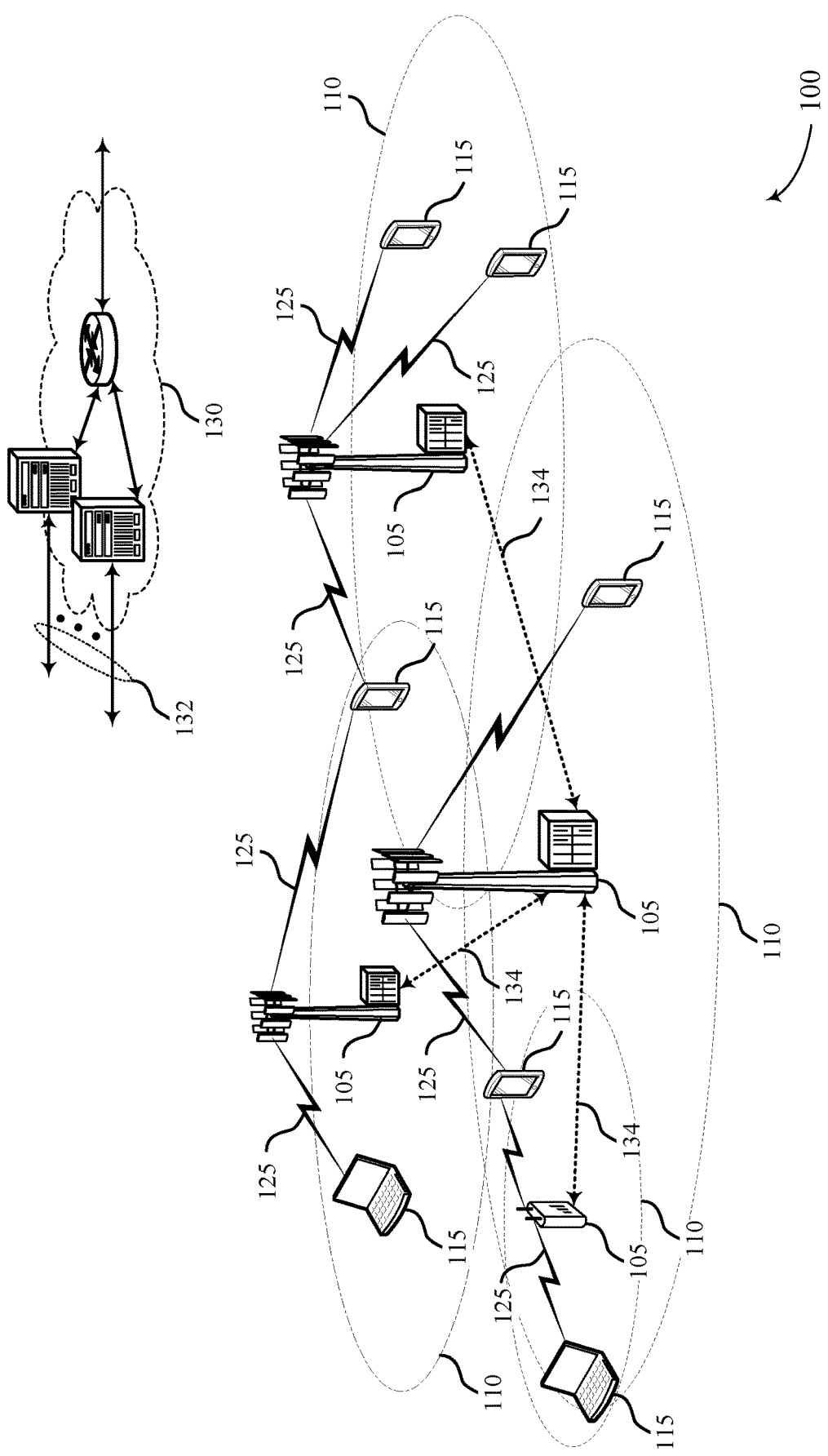
FIG. 1 illustrates an example of a wireless communications system that supports procedures for managing quality of service flows in accordance with aspects of the present disclosure.

In some wireless communications systems, a base station and a user equipment (UE) may support ultra-reliable communications or low latency communications, or various combinations thereof. UEs in a wireless communications systems may communicate with the data network within a protocol data unit session. In some examples, the protocol data unit session may be associated with a quality of service flow. In some cases, one or more service data flows with the same quality of service characteristics may be grouped together in a quality of service flow. In some examples, upon identifying uplink data in a buffer, a UE operating in some wireless communications systems, may report a buffer status of all its logical channels to a base station. In some examples, the UE may report a buffer size of a logical channel group (such as, using a buffer status report) instead of a logical channel. Thus, some wireless communications systems provide for a UE reporting a buffer status per logical channel group. In some examples, multiple quality of service flows may be mapped to the same logical channel. In such cases, a more granular buffer status reporting may be desired.

One or more aspects of the present disclosure provide for techniques to indicate buffer status on a quality of service flow basis instead of a logical channel group basis. In some examples, a UE may determine that uplink data associated with a first quality of service flow is available for transmission to a base station. In some cases, the UE may evaluate multiple conditions in response to determining that the uplink data is available. Upon determining that at least one of the one or more conditions is satisfied, the UE may transmit a buffer status report to the base station. In some examples, the UE may determine that the first quality of service flow is associated with a buffer that is empty other than the determined uplink data. In some cases, the UE may determine a second logical channel priority associated with a second quality of service flow. The first quality of service flow may be associated with a first logical channel priority which may be higher than the second logical channel priority. In some aspects, based on the determining that the first logical channel priority is higher than the second logical channel priority, the UE may transmit a buffer status report including a buffer status of the first quality of service flow. Upon transmitting the buffer status report, the UE may receive an uplink grant from the base station. In some examples, the UE may transmit the uplink data based on receiving the uplink grant.

UEs operating in wireless communications systems supporting low latency communications may utilize the techniques described herein to experience power saving and enhanced reliability in wireless communications, such as reduced power consumption and extended battery life while ensuring reliable and efficient communications. Particular aspects of the subject matter described in this disclosure may be implemented to realize one or more of the following potential advantages. The techniques employed by the described UEs and base stations may provide benefits and enhancements to the operation of the UEs. For example, operations performed by the UEs and the base stations may provide improvements to wireless operations. The described techniques may thus include features for improvements to power consumption, spectral efficiency, higher data rates, high reliability, and, in some examples, may promote enhanced efficiency for low latency operations, among other benefits.

Aspects of the disclosure are initially described in the context of a wireless communications system. Aspects of the disclosure are further illustrated by and described with reference to apparatus diagrams, system diagrams, and flowcharts that relate to procedures for managing quality of service flows.

FIG. 1 illustrates an example of a wireless communications system 100 that supports procedures for managing quality of service flows in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some implementations, a base station and a UE may communicate with a data network within a protocol data unit session. In some examples, a protocol data unit session may be associated with a quality of service flow, and one or more service data flows with the same quality of service characteristics may be grouped together in a quality of service flow. Upon identifying uplink data in a buffer, a UE may report a buffer status of all its logical channels to a base station. In some instances, a base station may allocate uplink resources after receiving a buffer status report from the UE. The UE may receive an uplink grant from the base station, in response to transmitting a buffer status report per logical channel group. After receiving the grant for an uplink resource (i.e., indicated by an uplink grant), the UE may allocate the resource among logical channels (e.g., logical channel having data in its buffer) based on one or more scheduling priorities. For example, the UE may allocate resources from the uplink grant such that, a logical channel with a higher priority transmits data earlier than a logical channel with a lower priority.

In some wireless communications systems, a UE may be configured to schedule uplink data according to scheduling priority allocated to logical channels. In some examples, multiple quality of service flows may be mapped to the same logical channel, and not all of the quality of service flows may have the same amount of traffic or quality of service requirements. Thus, according to some systems, the UE is configured to perform network scheduling per logical channel although the quality of service is defined per quality of service flow. Consequently, in some scenarios (e.g., where multiple quality of service flows are mapped to the same logical channel), a network scheduler may not be able to meet quality of service requirements of all quality of service flows. Prioritizing an uplink data according to a scheduling priority associated with logical channels may result in low reliability, especially in low latency communications. Thus, a more granular buffer status reporting may be used to optimize system resources and reliability for low latency communications. One or more aspects of the present disclosure provide for techniques to indicate buffer status on a quality of service flow basis.

According to one or more aspects of the present disclosure, a UE 115 may be configured to indicate buffer status on a quality of service flow basis instead of a logical channel group basis. In some examples, a UE 115 may determine that uplink data associated with a quality of service flow is available for transmission to a base station 105. Upon determining the availability of uplink data, the UE 115 may evaluate multiple conditions, and may transmit a buffer status report for the quality of service flow to the base station 105 if at least one of the one or more conditions is satisfied. In some cases, the UE 115 may transmit a buffer status report including a buffer status of the first quality of service flow. Upon transmitting the buffer status report, the UE 115 may receive an uplink grant from the base station 105, the UE 115 may transmit the uplink data based on receiving the uplink grant.

Figure 2:
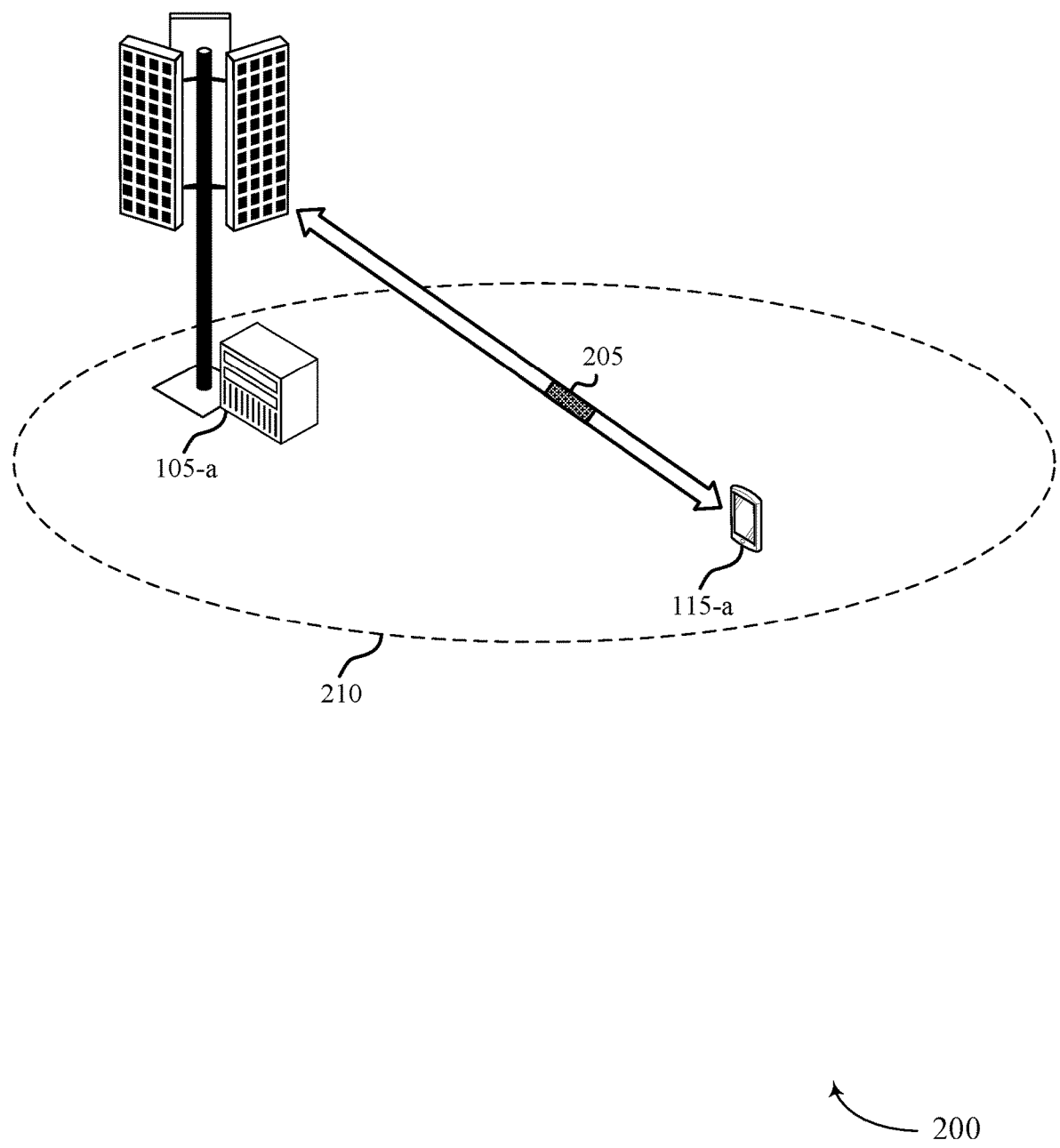
FIG. 2 illustrates an example of a wireless communications system that supports procedures for managing quality of service flows in accordance with aspects of the present disclosure.

FIG. 2 illustrates an example of a wireless communications system 200 that supports procedures for managing quality of service flows in accordance with aspects of the present disclosure. In some examples, the wireless communications system 200 may implement aspects of the wireless communications system 100. For example, the wireless communications system 200 may include a base station 105-a and one or more UEs 115, for example a UE 115-a, within a geographic coverage area 210. The base station 105-a and the UE 115-a may be examples of the corresponding devices described with reference to FIG. 1. In some examples, the wireless communications system 200 may support multiple RATs including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for high reliability in low latency communications, among other benefits.

The wireless communications system 200 may be configured to support ultra-reliable communications or low latency communications, or various combinations thereof. For example, the UE 115-a and the base station 105-a in the wireless communications system 200 may support ultra-reliable communications or low latency communications, or various combinations thereof. In some examples, the UE 115-a and the base station 105-a may support eMBB communications. In some other examples, the UE 115-a and the base station 105-a may support ultra-reliable and low-latency communication (URLLC) or mission critical communications.

Wireless communications systems (such as, the wireless communications system 200) may support a wide range of capabilities. In some aspects, supporting such wide range of capabilities may entail maintenance of one or more quality of service parameters. In some examples, the one or more quality of service parameters may include delay, error rate, and priority. According to one or more aspects, a UE (such as, the UE 115-a) may communicate with a data network by setting up a protocol data unit session. In one example, the UE may communicate with the data network within the protocol data unit session. In some examples, a protocol data unit session may be associated with a quality of service flow.

In some cases, one or more service data flows with the same quality of service characteristics may be grouped together in a quality of service flow.

According to some examples, a protocol stack for a UE and a network device (or base station) may include three layers: Layer 1, Layer 2, and Layer 3. Layer 1 may be the lowest layer and implements various physical layer signal processing functions (such as, monitoring, controlling, or otherwise managing aspects of the wireless transmissions over a wireless medium). Layer 2 may be responsible for managing aspects of the wireless link between the UE and the network device (or base station) over a physical sublayer. Layer 2 (such as, packet data convergence protocol layer included in Layer 2) may also provide multiplexing between different radio bearers and logical channels. In some examples, a logical channel may define what type of information is being transmitted over the air interface (e.g., user traffic, control channels, or broadcast information). In some aspects, two or more logical channels may be combined into a logical channel group. In some examples, a protocol stack also include a service data adaptation protocol sublayer, which may perform functions such as mapping between a quality of service flow and dedicated radio bearers, marking quality of service flow identifier in both downlink and uplink packets, and the like.

In wireless communications systems architecture (such as, NR system architecture), a quality of service flow may be the smallest traffic unit (i.e., a level at which quality of service is enforced). As discussed herein, a UE (such as, UE 115-*a*) may be configured with multiple dedicated radio bearers within a protocol data unit session Additionally, there may be multiple quality of service flows within each dedicated radio bearer. Each quality of service flow may be identified by a quality of service flow identifier indicating a quality of service flow to map a service data flow. Additionally or alternatively, each quality of service flow, identified by a quality of service flow identifier, may include one or more quality of service attributes (such as, guaranteed bit rate and delay budget).

In some aspects, each dedicated radio bearer may be mapped to a logical channel, each of which is configured with a scheduling priority. A UE (such as, UE 115-*a*) may use the scheduling priority to determine a technique to split uplink resources for different logical channels. According to a scheduling framework of an NR system, a UE may identify an arrival of uplink data in a buffer. Upon identifying the uplink data, the UE may report a buffer status of all its logical channels to a base station (such as, base station 105-*a*). In some examples, to simplify the reporting technique, the base station may configure multiple logical channels into a logical channel group. In such cases, the UE may report a buffer size of a logical channel group (such as, using a buffer status report) instead of a logical channel. That is, the UE may report a buffer status per logical channel group instead of a buffer status per logical channel.

According to one or more examples, a UE (such as, UE 115-*a*) may be configured to report buffer status on a quality of service flow basis instead of a logical channel basis. In some examples, a base station 105-*a* may indicate to the UE 115-*a*, whether to transmit a buffer status report based on a quality of service flow or a logical channel. In some examples, the base station 105-*a* may also track a data volume at a quality of service flow level based on a packet data convergence protocol. In some examples, the base station 105-*a* may configure the UE 115-*a* to report buffer status using a configuration signal.

In some implementations, the UE 115-*a* may determine that uplink data associated with a first quality of service flow is available for transmission to the base station 105-*a*. The UE 115-*a* may then evaluate multiple conditions, and may transmit a buffer status report based on the first quality of service flow if one or more of the conditions are met. In some cases, the UE 115-*a* may determine whether the uplink data belongs to an empty quality of service flow (e.g., a quality of service flow associated with a buffer that was empty prior to the arrival of the uplink data) which is associated with the highest logical channel priority among all quality of service flows including buffered data. For instance, the UE 115-*a* may determine that the first quality of service flow is associated with a buffer that is empty other than the determined uplink data. The UE 115-*a* may further determine that the first quality of service flow is associated with a first logical channel priority. The UE 115-*a* may then determine a second logical channel priority associated with a second quality of service flow, and may compare the first logical channel priority with the second logical channel priority. The UE 115-*a* may determine that the second quality of service flow includes buffered data. In some examples, based on the determining that the first logical channel priority is higher than the second logical channel priority, the UE 115-*a* may transmit a buffer status report including a buffer status of the first quality of service flow.

Additionally or alternatively, the UE 115-*a* may transmit a buffer status report including a buffer status of the first quality of service flow if the UE 115-*a* determines that no other quality of service flows include buffered data. For instance, the UE 115-*a* may determine that one or more quality of service flows are devoid of buffered data. The UE 115-*a* may transmit a buffer status report including the buffer status of the first quality of service flow based on determining that one or more quality of service flows are devoid of buffered data. In some examples, the UE 115-*a* may transmit the buffer status report by using an enhanced buffer status report MAC control element. For instance, the UE 115-*a* may be configured to extend the existing buffer status report MAC control element to provide a flag or set of bits to indicate a specific quality of service flow within a logical channel.

In one or more examples, the UE 115-*a* may be triggered to transmit the buffer status report including the buffer status of the first quality of service flow by a periodic buffer status timer. The UE 115-*a* may determine that a timer has elapsed since transmission of a prior buffer status report, and may transmit the buffer status report including the buffer status of the first quality of service flow based on determining that the timer has elapsed. Upon transmission of the buffer status report including a buffer status of the first quality of service flow, the UE 115-*a* may receive an uplink grant 205 from the base station 105-*a*. For example, the uplink grant 205 may be based on the quality of service flows instead of logical channels or logical channel groups. The UE 115-*a* may then utilize the uplink grant 205 to transmit the uplink data.

According to one or more aspects of the present disclosure, the UE 115-*a* may be configured with a flow-based buffer status report. The flow-based buffer status report may be separate from a buffer status report triggered per logical channel. In some implementations, the flow-based buffer status report may be triggered when a quality of service of a flow fails to satisfy a threshold. In some examples, the UE 115-*a* may signal the flow-based buffer status report using one or more of a MAC control element, a radio resource control message (e.g., an information element in UE Assistance Information), or a service data adaptation protocol data unit. The flow-based buffer status report may be performed independently from the existing buffer status reporting procedures. In some cases, the UE 115-a may transmit the flow-based buffer status report if one or more thresholds are not satisfied. In one implementation, the base station 105-a may transmit a signal indicating one or more thresholds for triggering the flow-based buffer status report. That is, the base station 105-a may configure one or more quality of service flows for triggering flow-based buffer status report. Additionally or alternatively, the base station 105-a may configure a threshold for triggering flow-based buffer status report. The signal indicating the one or more thresholds may include at least one of a MAC control element, a radio resource control message, or a service data adaptation protocol data unit.

As previously discussed, the UE 115-a may determine that uplink data associated with a first quality of service flow is available for transmission to the base station 105-a. The UE 115-a may transmit a flow-based buffer status report if one or more of the thresholds are met. In one example, the UE 115-a may determine that an uplink data included in a quality of service flow has been buffered longer than a configured threshold. For instance, the UE 115-a may determine that at least a portion of the uplink data has been buffered for more than a threshold time period. In such a case, the UE 115-a may trigger the flow-based buffer status report for the quality of service flow. That is, the UE 115-a may transmit the flow-based buffer status report including the buffer status of the first quality of service flow based on determining that at least the portion of the uplink data has been buffered. In some examples, the quality of service flow may be associated with a delay requirement.

In some cases, the UE 115-a may apply a moving-average to estimate the bit rate of the first quality of service flow (i.e., the flow being served by the UE 115-a). The UE 115-a may trigger a flow-based buffer status report when the estimated bit rate is less than the guaranteed bit rate by a threshold or by a number of consecutive measurement intervals. For example, the UE 115-a may determine, based on a moving-average method, a bit rate associated with the first quality of service flow. A moving average method may be calculated by creating a series of averages of different subsets of a full data set. In some cases, the different subsets may be overlapping or non-overlapping. For example, the UE 115-a may determine a first average bit rate associated with the first quality of service flow over a first time window and a second average bit rate associated with the first quality of service flow over a second time window. The UE 115-a may then determine that a difference between the calculated bit rate and a predetermined bit rate satisfies a threshold bit rate. With reference to the previous example, the UE 115-a may determine whether the first average bit rate and the second average bit rate satisfies the guaranteed bit rate by a threshold.

Additionally or alternatively, the UE 115-a may determine, for each of the number of consecutive measurement intervals, that a difference between the calculated bit rate and a predetermined bit rate satisfies a threshold bit rate. In such cases, the UE 115-a may transmit the flow-based buffer status report including the buffer status of the first quality of service flow based on either determining that the difference satisfies the threshold or determining that the difference satisfies the threshold for each of the number of consecutive measurement intervals or both. As described herein, the first quality of service flow may be associated with a guaranteed bit rate. In some examples, the UE 115-a may be configured to report additional quality of service attributes (such as, queueing delay) using either an enhanced buffer status report or a flow-based buffer status report. In some examples, the UE 115-a may receive an uplink grant 205 from the base station 105-a, based on transmitting the flow-based buffer status report. The UE 115-a may transmit the uplink data based on receiving the uplink grant 205.

In addition to enhancements to buffer status reporting, the UE 115-a may also remap one or more quality of service flows to a different logical channel, if the UE 115-a determines that a quality of service threshold may not be met. In one example, the base station 105-a may transmit a signal indicating whether a quality of service flow is allowable to trigger remapping. Additionally or alternatively, the base station 105-a may configure one or more thresholds for triggering remapping.

In some cases, the one or more thresholds for triggering remapping may be different from the one or more thresholds triggering flow-based buffer status report. In some cases, for a quality of service flow having a delay requirement, the UE 115-a may remap a quality of service flow when its oldest data included in the buffer of the quality of service flow has been buffered longer than a configured threshold. For example, the UE 115-a may determine that a first quality of service flow associated with the uplink data satisfies a threshold, and may remap the first quality of service flow to a logical channel based on the determining. In some examples, the UE 115-a may determine that at least a portion of the uplink data has been buffered for more than a threshold time period, and may remap the first quality of service flow to the logical channel based on determining that at least the portion of the uplink data has been buffered.

According to one aspect, the UE 115-a may apply a moving-average to estimate the bit rate of the first quality of service flow. The UE 115-a may be configured to remap the first quality of service flow if the estimated bit rate is less than the guaranteed bit rate by a threshold (e.g., a value R1) or by a number (e.g., a value N1) of consecutive measurement intervals. In some cases, the first quality of service flow may be associated with a guaranteed bit rate. For example, the UE 115-a may determine, based on a moving-average, a bit rate associated with the first quality of service flow, and may determine that a difference between the calculated bit rate and a predetermined bit rate satisfies a threshold bit rate. In such cases, the UE 115-a may remap the first quality of service flow to the logical channel based on determining that the difference satisfies the threshold or determining that the difference satisfies the threshold for each of the number of consecutive measurement intervals or both.

Figure 3:
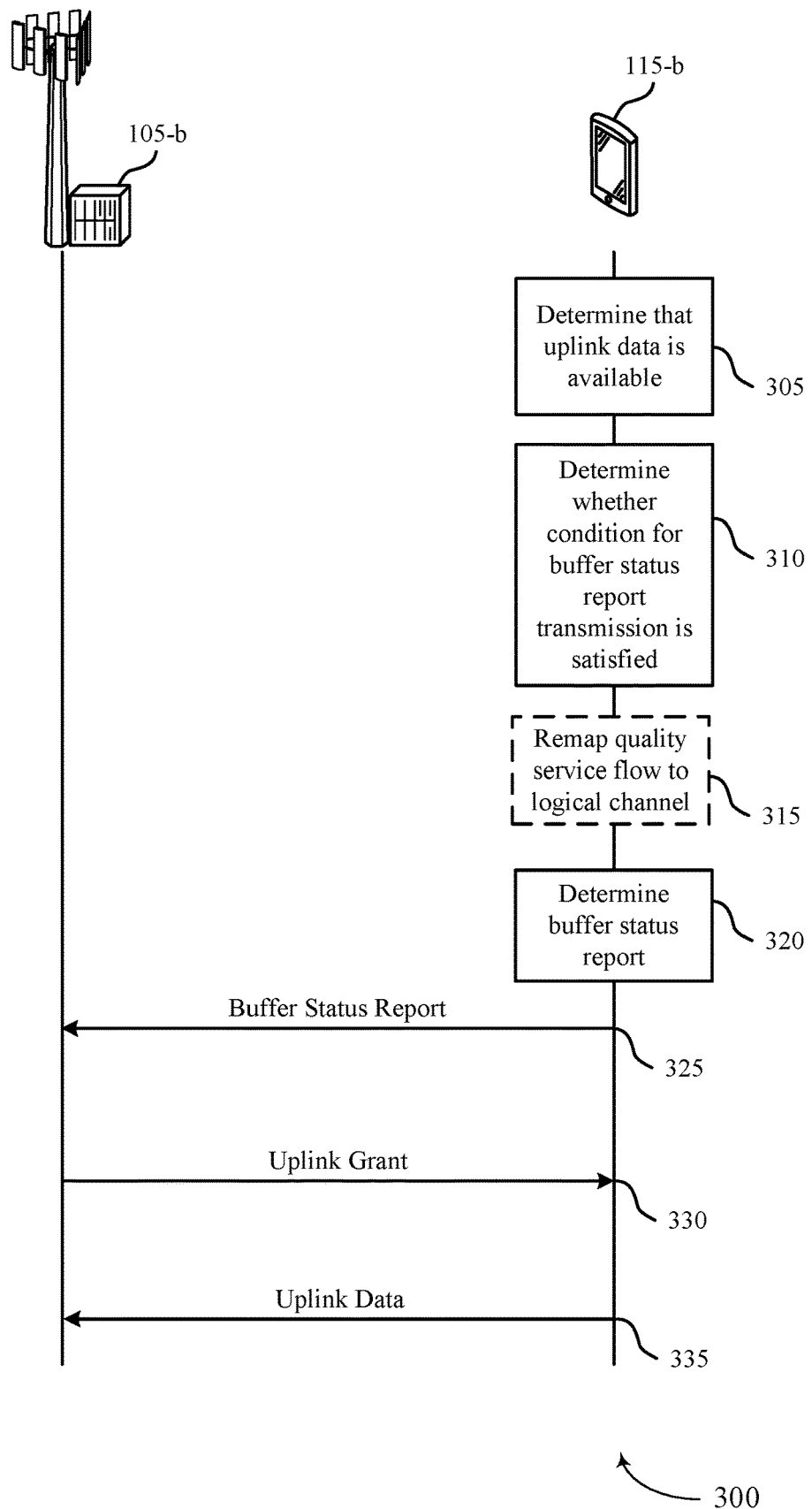
FIG. 3 illustrates an example of a process flow that supports procedures for managing quality of service flows in accordance with aspects of the present disclosure.

FIG. 3 illustrates an example of a process flow 300 that supports procedures for managing quality of service flows in accordance with aspects of the present disclosure. In some examples, the process flow 300 may implement aspects of the wireless communications system 100 and 200 described with reference to FIGS. 1 and 2, respectively. For example, the process flow 300 may be based on a configuration by a base station 105-b or a UE 115-b, for reduced power consumption, and may promote low latency for wireless communications, among other benefits. The base station 105-b and the UE 115-b may be examples of a base station 105 and a UE 115, as described with reference to FIGS. 1 and 2. In the following description of the process flow 300, the operations between the base station 105-b and the UE 115-b may be transmitted in a different order than the example order shown, or the operations performed by the base station 105-b and the UE 115-b may be performed in different orders or at different times. Some operations may also be omitted from the process flow 300, and other operations may be added to the process flow 300.

At 305, the UE 115-*b* may determine that uplink data associated with a first quality of service flow is available for transmission to a base station (such as, base station 105-*b*). In one example, the UE 115-*b* may determine that new data has arrived in a buffer, and is awaiting transmission to the base station 105-*b*.

At 310, the UE 115-*b* may determine whether one or more conditions for buffer status report transmission is satisfied. In some examples, the UE 115-*b* may determine whether the uplink data belongs to a buffer, which was otherwise empty. That is, the UE 115-*b* may determine that the first quality of service flow is associated with a buffer that is empty other than the determined uplink data. The UE 115-*b* may additionally determine that the first quality of service flow is associated with a first logical channel priority. In some cases, the UE 115-*b* may determine a second logical channel priority associated with a second quality of service flow, and compare the first logical channel priority with the second logical channel priority. In some cases, the UE 115-*b* determines that the condition for buffer status report transmission is satisfied if the first logical channel priority is higher than the second logical channel priority, and the second quality of service flow includes buffered data.

In another example, the UE 115-*b* may determine that the condition for buffer status report transmission is satisfied based on determining that no other quality of service flows (i.e., no quality of service flow other than the first quality of service flow) include buffered data. Additionally or alternatively, the UE 115-*b* may determine that the condition for buffer status report transmission is satisfied based on a periodic buffer status timer.

At 315, the UE 115-*b* may optionally determine that the first quality of service flow associated with the uplink data satisfies a threshold, and may remap the first quality of service flow to a logical channel based on the determining. As such, the threshold for remapping the first quality of service flow may be different from the condition for buffer status report transmission.

At 320, the UE 115-*b* may determine a buffer status report. For example, the UE 115-*b* may be configured to extend the existing buffer status report MAC control element to provide a flag or set of bits to indicate a specific quality of service flow within a logical channel.

At 325, the UE 115-*b* may transmit, to the base station 105-*b*, a buffer status report including a buffer status (such as, the buffer status report determined at 320) of the first quality of service flow. At 330, the base station 105-*b* may transmit an uplink grant based on receiving the buffer status report. At 335, the UE 115-*b* may transmit the uplink data based on the uplink grant.

The operations performed by the base station 105-*b* and the UE 115-*b* as part of, but not limited to, process flow 300 may provide improvements to UE 115-*b* buffer status report transmission. Furthermore, the operations performed by the base station 105-*b* and the UE 115-*b* as part of, but not limited to, process flow 300 may provide benefits and enhancements to the operation of the UE 115-*b*. For example, the described buffer report transmission operations in the process flow 300 may support reduced power consumption, increased efficiency, among other advantages.

Figure 4:
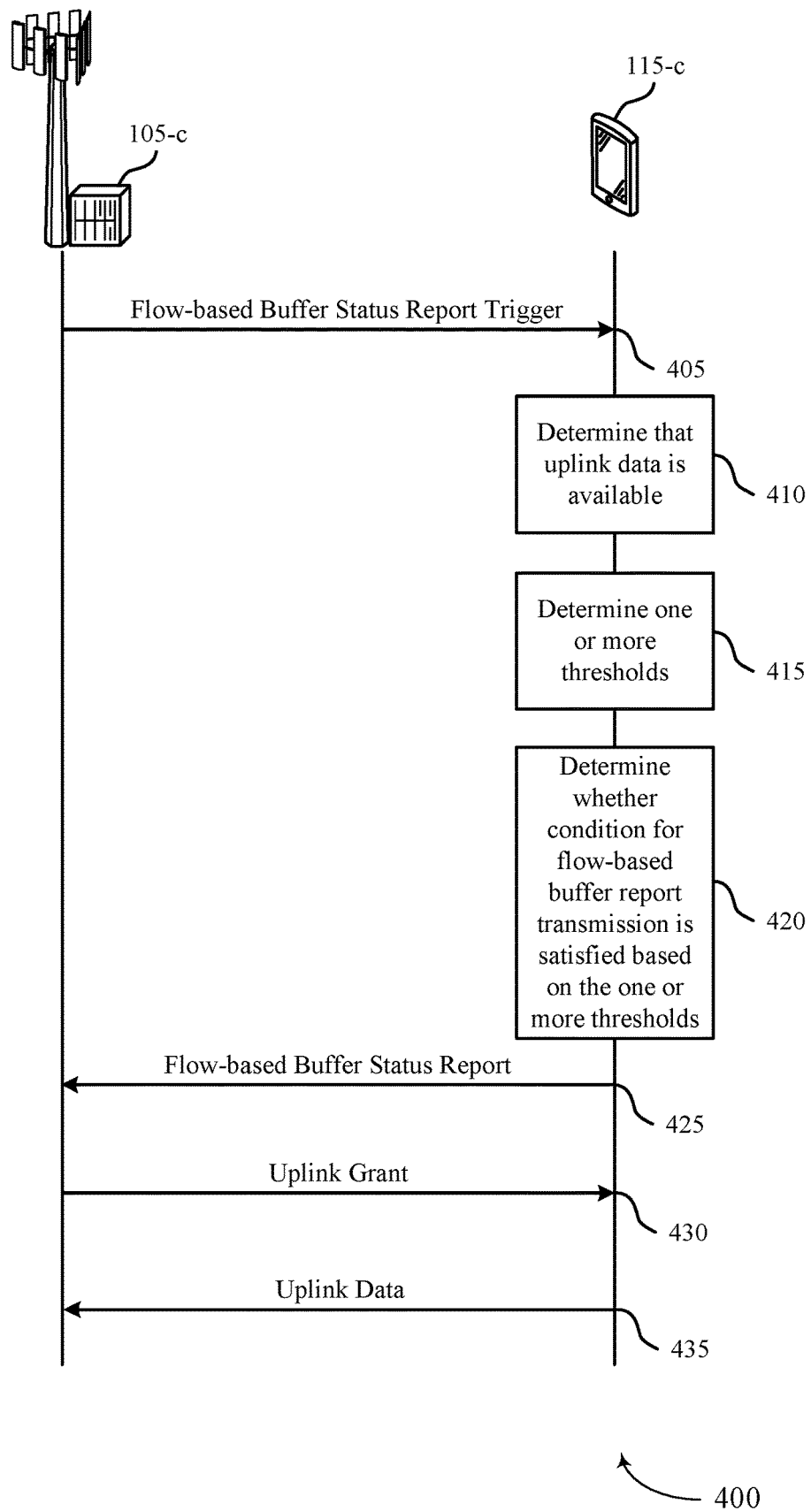
FIG. 4 illustrates an example of a process flow that supports procedures for managing quality of service flows in accordance with aspects of the present disclosure.

FIG. 4 illustrates an example of a process flow 400 that supports procedures for managing quality of service flows in accordance with aspects of the present disclosure. In some examples, the process flow 400 may implement aspects of the wireless communications system 100 and 200 described with reference to FIGS. 1 and 2, respectively. For example, the process flow 400 may be based on a configuration by a base station 105-*c* or a UE 115-*c*, and may promote low latency for wireless communications, among other benefits. The base station 105-*c* and the UE 115-*c* may be examples of a base station 105 and a UE 115, as described with reference to FIGS. 1 and 2. In the following description of the process flow 400, the operations between the base station 105-*c* and the UE 115-*c* may be transmitted in a different order than the example order shown, or the operations performed by the base station 105-*c* and the UE 115-*c* may be performed in different orders or at different times. Some operations may also be omitted from the process flow 400, and other operations may be added to the process flow 400.

At 405, the base station 105-*c* may configure the UE 115-*c* with a flow-based buffer status report. The flow-based buffer status report may be separate from a buffer status report triggered per logical channel (e.g., enhanced buffer status report described with reference to FIG. 3). In some implementations, the flow-based buffer status report may be triggered when a quality of service of a flow fails to satisfy a threshold.

At 410, the UE 115-*c* may determine that uplink data associated with a first quality of service flow is available for transmission to a base station (such as, base station 105-*c*). At 415, the UE 115-*c* may determine one or more thresholds. In one implementation, the base station 105-*c* may transmit a signal indicating one or more thresholds for triggering a flow-based buffer status report (not shown). The signal indicating the one or more thresholds may include at least one of a MAC control element, a radio resource control message, or a service data adaptation protocol data unit.

At 420, the UE 115-*c* may determine whether one or more conditions for buffer status report transmission is satisfied. For example, the UE 115-*c* may determine the one or more conditions based on the one or more thresholds. In one example, the UE 115-*c* may trigger the flow-based buffer status report for the quality of service flow based on determining that at least the portion of the uplink data has been buffered. In some examples, the quality of service flow may be associated with a delay requirement. In some implementations, the UE 115-*c* may apply a moving-average to estimate the bit rate of the first quality of service flow, and may trigger a flow-based buffer status report when the estimated bit rate is less than the guaranteed bit rate by a threshold or by a number of consecutive measurement intervals.

At 425, the UE 115-*c* may transmit, to the base station 105-*c*, a flow-based buffer status report including a buffer status of the first quality of service flow. In some examples, the UE 115-*c* may signal the flow-based buffer status report using one or more of a MAC control element, a radio resource control message (e.g., an information element in UE Assistance Information), or a service data adaptation protocol data unit. The flow-based buffer status report may be performed independently from the existing buffer status reporting procedures. At 430, the base station 105-*c* may transmit an uplink grant based on receiving the flow-based buffer status report. At 425, the UE 115-*c* may transmit the uplink data based on the uplink grant.

The operations performed by the base station 105-*c* and the UE 115-*c* as part of, but not limited to, process flow 400 may provide improvements to UE 115-*c* buffer status report transmission. Furthermore, the operations performed by the base station 105-*c* and the UE 115-*c* as part of, but not limited to, process flow 400 may provide benefits and enhancements to the operation of the UE 115-*c*.

Figure 5:
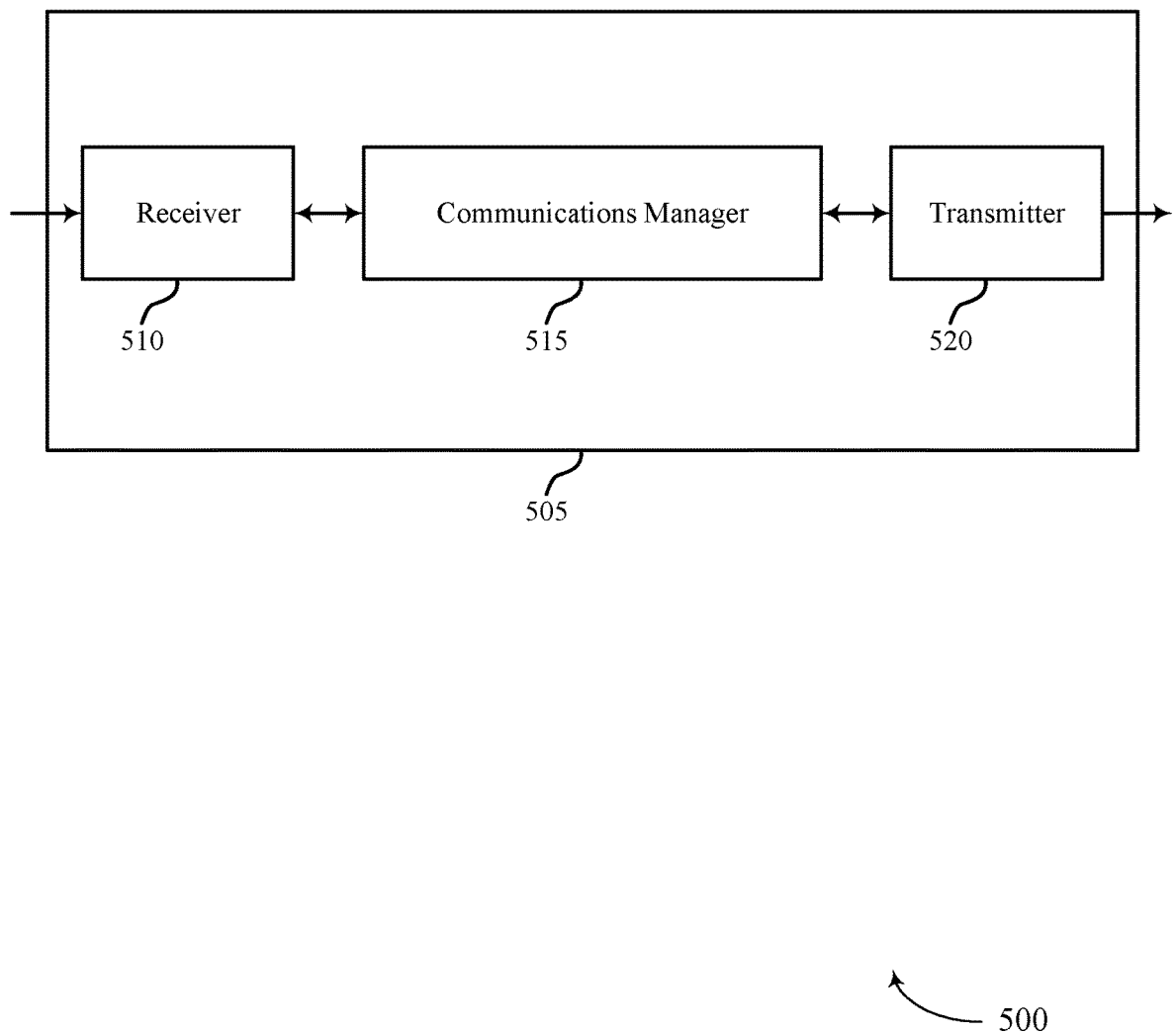
FIGS. 5 and 6 show block diagrams of devices that support procedures for managing quality of service flows in accordance with aspects of the present disclosure.

FIG. 5 shows a block diagram 500 of a device 505 that supports procedures for managing quality of service flows in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to procedures for managing quality of service flows). Information may be passed on to other components of the device 505. The receiver 510 may be an example of aspects of the transceiver 820 described with reference to FIG. 8. The receiver 510 may utilize a single antenna or a set of antennas.

The communications manager 515 may determine that uplink data associated with a first quality of service flow is available for transmission to a base station, transmit, to the base station, a buffer status report including a buffer status of the first quality of service flow, receive, from the base station, an uplink grant based on transmitting the buffer status report, and transmit the uplink data based on the uplink grant. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 515 as described herein may be implemented to realize one or more potential advantages. One implementation may allow a UE 115 supporting low latency communications to operate more efficiently and reliably. For example, by utilizing techniques to indicate a buffer status report on a quality of service flow basis instead of a logical channel group basis, the UE 115 may provide more granular buffer status reporting to a base station or any other wireless device. In addition, using the described technique may provide improvements to wireless operations such as decreased power consumption, increased spectral efficiency, higher data rates, and high reliability.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
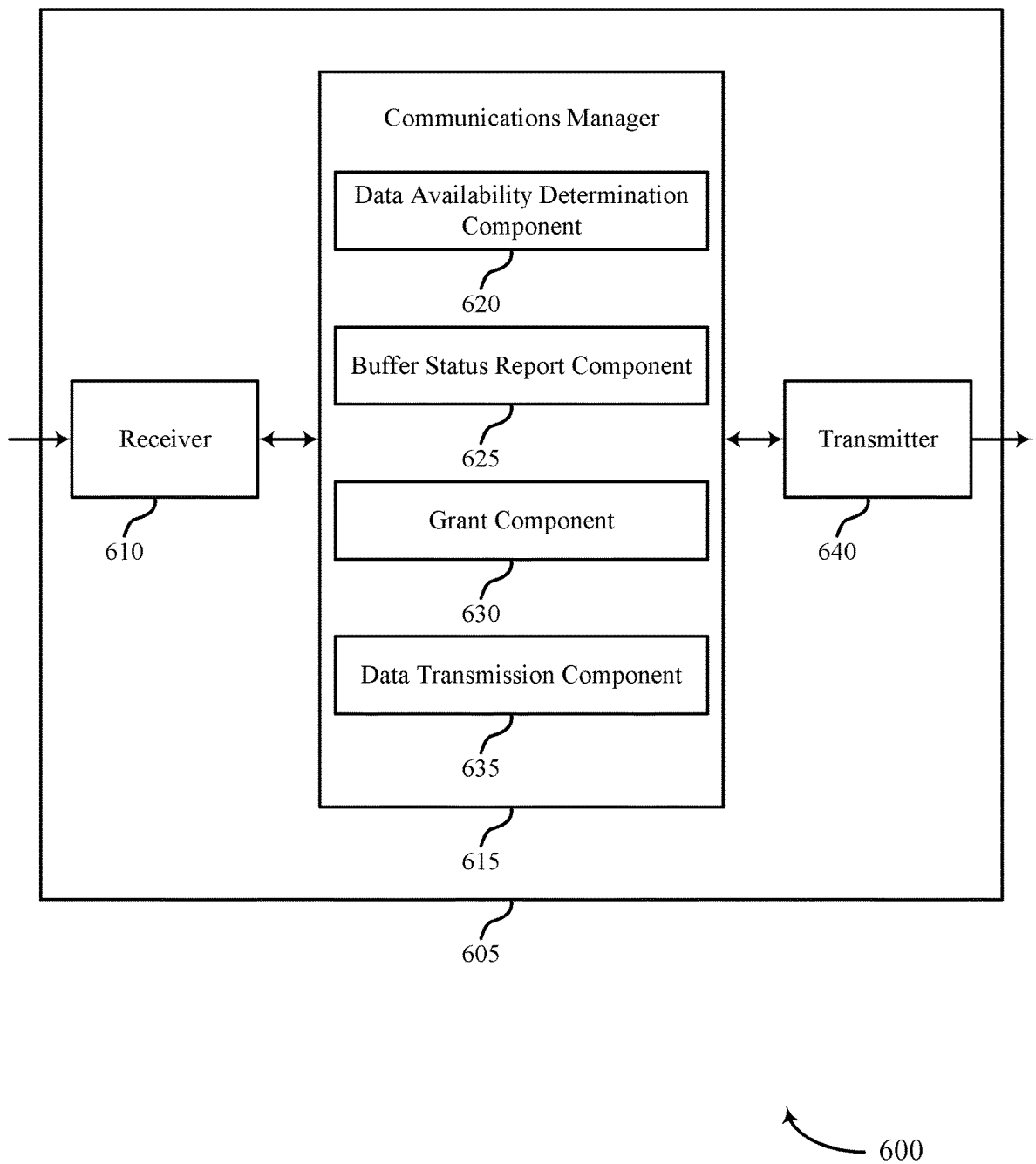

FIG. 6 shows a block diagram 600 of a device 605 that supports procedures for managing quality of service flows in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to procedures for managing quality of service flows). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a data availability determination component 620, a buffer status report component 625, a grant component 630, and a data transmission component 635. The communications manager 615 may be an example of aspects of the communications manager 810 described herein.

The data availability determination component 620 may determine that uplink data associated with a first quality of service flow is available for transmission to a base station. The buffer status report component 625 may transmit, to the base station, a buffer status report including a buffer status of the first quality of service flow. The grant component 630 may receive, from the base station, an uplink grant based on transmitting the buffer status report. The data transmission component 635 may transmit the uplink data based on the uplink grant.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
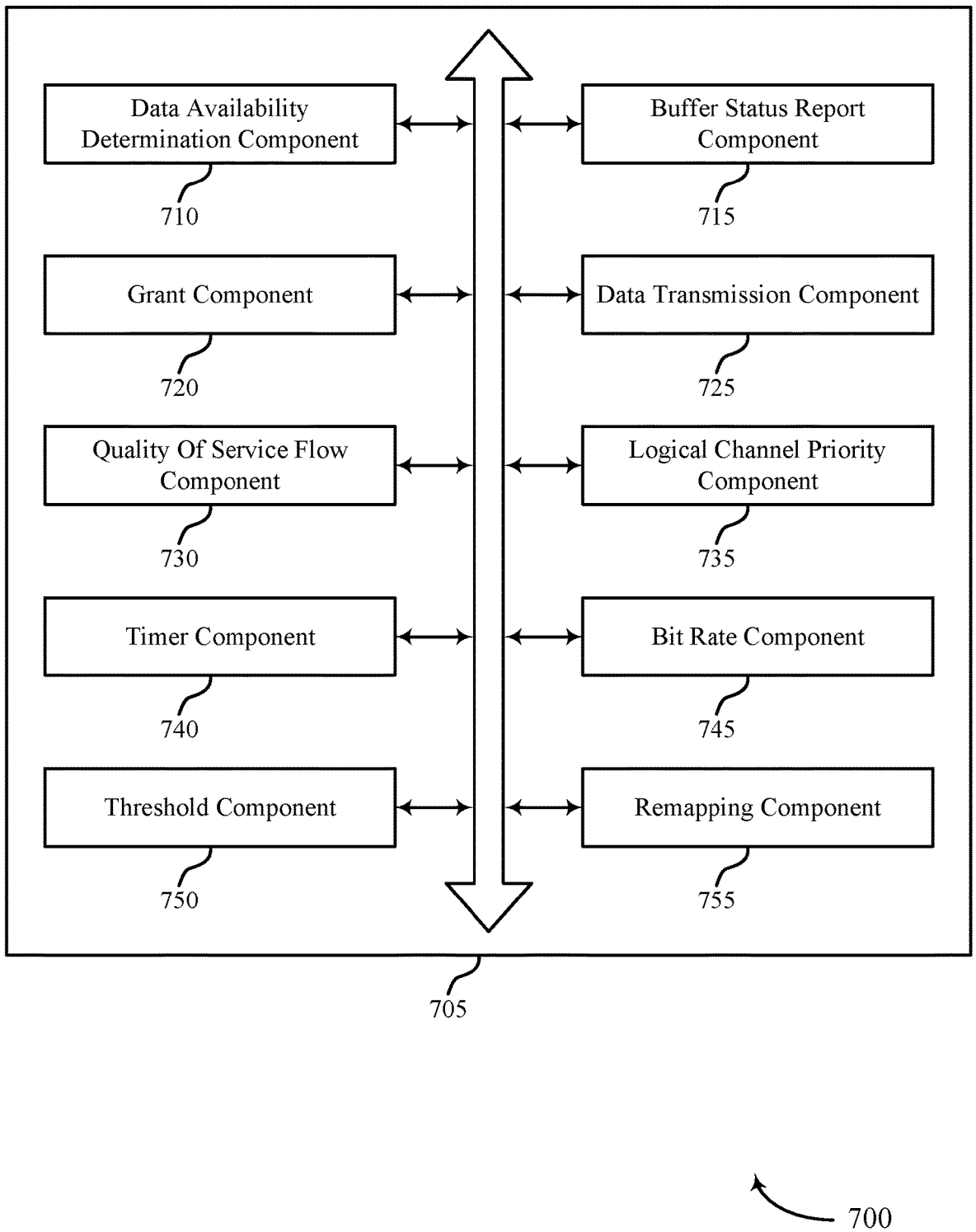
FIG. 7 shows a block diagram of a communications manager that supports procedures for managing quality of service flows in accordance with aspects of the present disclosure.

FIG. 7 shows a block diagram 700 of a communications manager 705 that supports procedures for managing quality of service flows in accordance with aspects of the present disclosure. The communications manager 705 may be an example of aspects of a communications manager 515, a communications manager 615, or a communications manager 810 described herein. The communications manager 705 may include a data availability determination component 710, a buffer status report component 715, a grant component 720, a data transmission component 725, a quality of service flow component 730, a logical channel priority component 735, a timer component 740, a bit rate component 745, a threshold component 750, and a remapping component 755. Each of these modules may communicate, directly or indirectly, with one another (e.g., via one or more buses).

The data availability determination component 710 may determine that uplink data associated with a first quality of service flow is available for transmission to a base station. The buffer status report component 715 may transmit, to the base station, a buffer status report including a buffer status of the first quality of service flow. The data transmission component 725 may transmit the uplink data based on the uplink grant. The grant component 720 may receive, from the base station, an uplink grant based on transmitting the buffer status report.

The quality of service flow component 730 may determine that the first quality of service flow is associated with a buffer that is empty other than the determined uplink data, where the first quality of service flow is associated with a first logical channel priority. The logical channel priority component 735 may determine a second logical channel priority associated with a second quality of service flow, where transmitting the buffer status report including the buffer status of the first quality of service flow is based on a comparison of the first logical channel priority with the second logical channel priority. In some cases, the second quality of service flow includes buffered data.

In some examples, the quality of service flow component 730 may determine that a second quality of service flow is devoid of buffered data, where transmitting the buffer status report including the buffer status of the first quality of service flow is based on the determining. The timer component 740 may determine that a timer has elapsed since transmission of a prior buffer status report, where transmitting the buffer status report including the buffer status of the first quality of service flow is based on the determining.

In some examples, the quality of service flow component 730 may determine that at least a portion of the uplink data has been buffered for more than a threshold time period. In some examples, the buffer status report component 715 may transmit the buffer status report including the buffer status of the first quality of service flow based on determining that at least the portion of the uplink data has been buffered. In some cases, the first quality of service flow is associated with a delay requirement.

The bit rate component 745 may determine, based on a moving-average, a bit rate associated with the first quality of service flow. In some examples, the bit rate component 745 may determine that a difference between the calculated bit rate and a predetermined bit rate satisfies a threshold bit rate. In some examples, the buffer status report component 715 may transmit the buffer status report including the buffer status of the first quality of service flow based on determining that the difference satisfies the threshold.

In some examples, the bit rate component 745 may determine, for a number of consecutive measurement intervals and based on a moving-average, a bit rate associated with the first quality of service flow. In some examples, the bit rate component 745 may determine, for each of the number of consecutive measurement intervals, that a difference between the calculated bit rate and a predetermined bit rate satisfies a threshold bit rate. In some examples, the buffer status report component 715 may transmit the buffer status report including the buffer status of the first quality of service flow based on determining that the difference satisfies the threshold for each of the number of consecutive measurement intervals.

In some examples, the remapping component 755 may remap the first quality of service flow to the logical channel based on determining that the difference satisfies the threshold for each of the number of consecutive measurement intervals.

The threshold component 750 may receive, from the base station, a signal indicating the one or more thresholds for triggering the buffer status report. In some cases, the signal indicating one or more thresholds includes at least one of a MAC control element, a radio resource control message, or a service data adaptation protocol data unit.

In some examples, the threshold component 750 may determine that the first quality of service flow associated with the uplink data satisfies a threshold. The remapping component 755 may remap the first quality of service flow to a logical channel based on the determining. In some examples, the threshold component 750 may determine that at least a portion of the uplink data has been buffered for more than a threshold time period. In some examples, the remapping component 755 may remap the first quality of service flow to the logical channel based on determining that at least the portion of the uplink data has been buffered.

In some examples, the quality of service flow component 730 may determine that the first quality of service flow associated with the uplink data satisfies one or more thresholds, where transmitting the buffer status report including the buffer status of the first quality of service flow is based on the determining.

In some examples, the threshold component 750 may determine that a difference between the calculated bit rate and a predetermined bit rate satisfies a threshold bit rate. In some examples, the threshold component 750 may determine, for each of the number of consecutive measurement intervals, that a difference between the calculated bit rate and a predetermined bit rate satisfies a threshold bit rate. In some examples, the remapping component 755 may remap the first quality of service flow to the logical channel based on determining that the difference satisfies the threshold.

Figure 8:
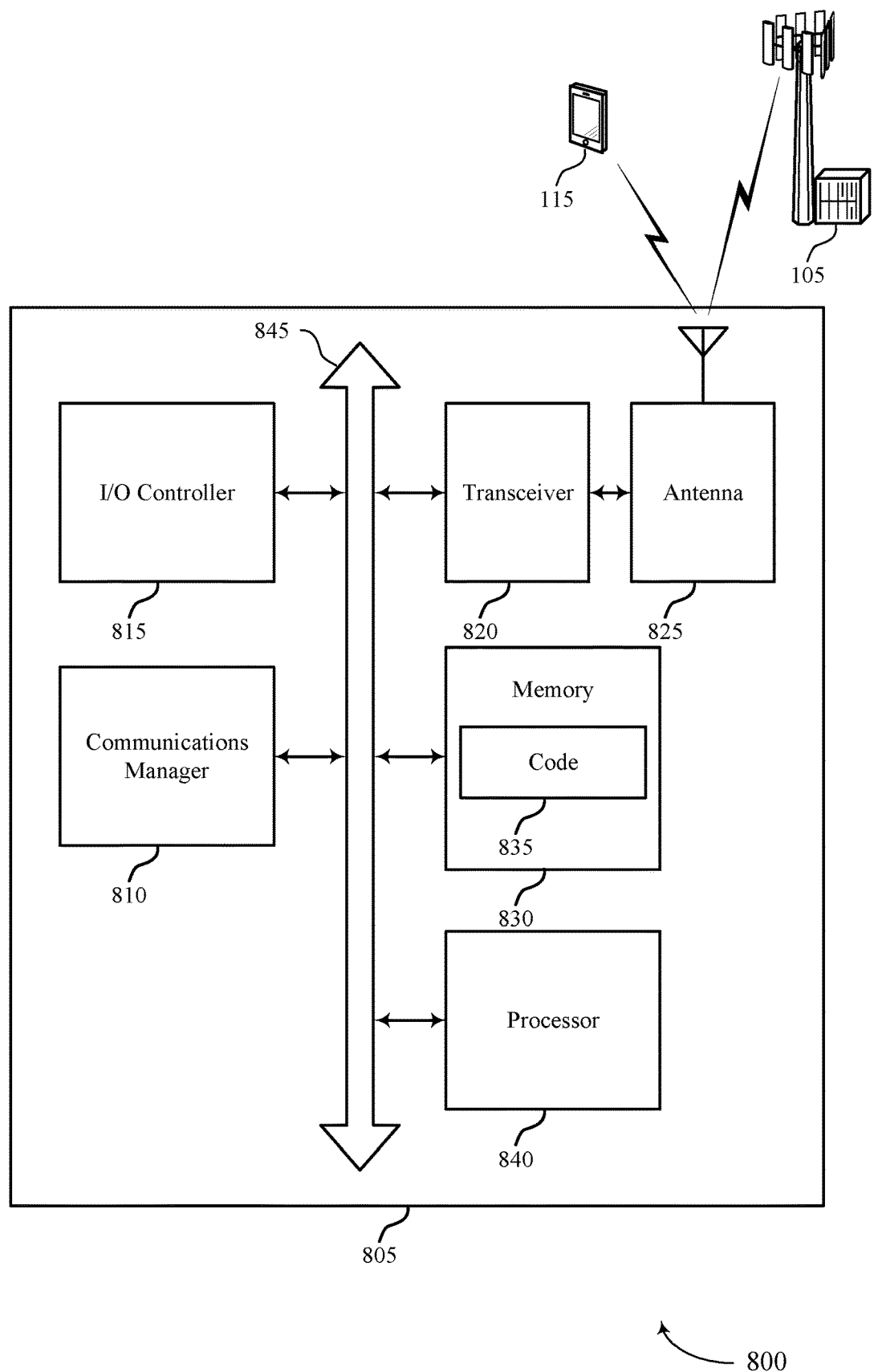
FIG. 8 shows a diagram of a system including a device that supports procedures for managing quality of service flows in accordance with aspects of the present disclosure.

FIG. 8 shows a diagram of a system 800 including a device 805 that supports procedures for managing quality of service flows in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine that uplink data associated with a first quality of service flow is available for transmission to a base station, transmit, to the base station, a buffer status report including a buffer status of the first quality of service flow, receive, from the base station, an uplink grant based on transmitting the buffer status report, and transmit the uplink data based on the uplink grant.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases, the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting procedures for managing quality of service flows).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
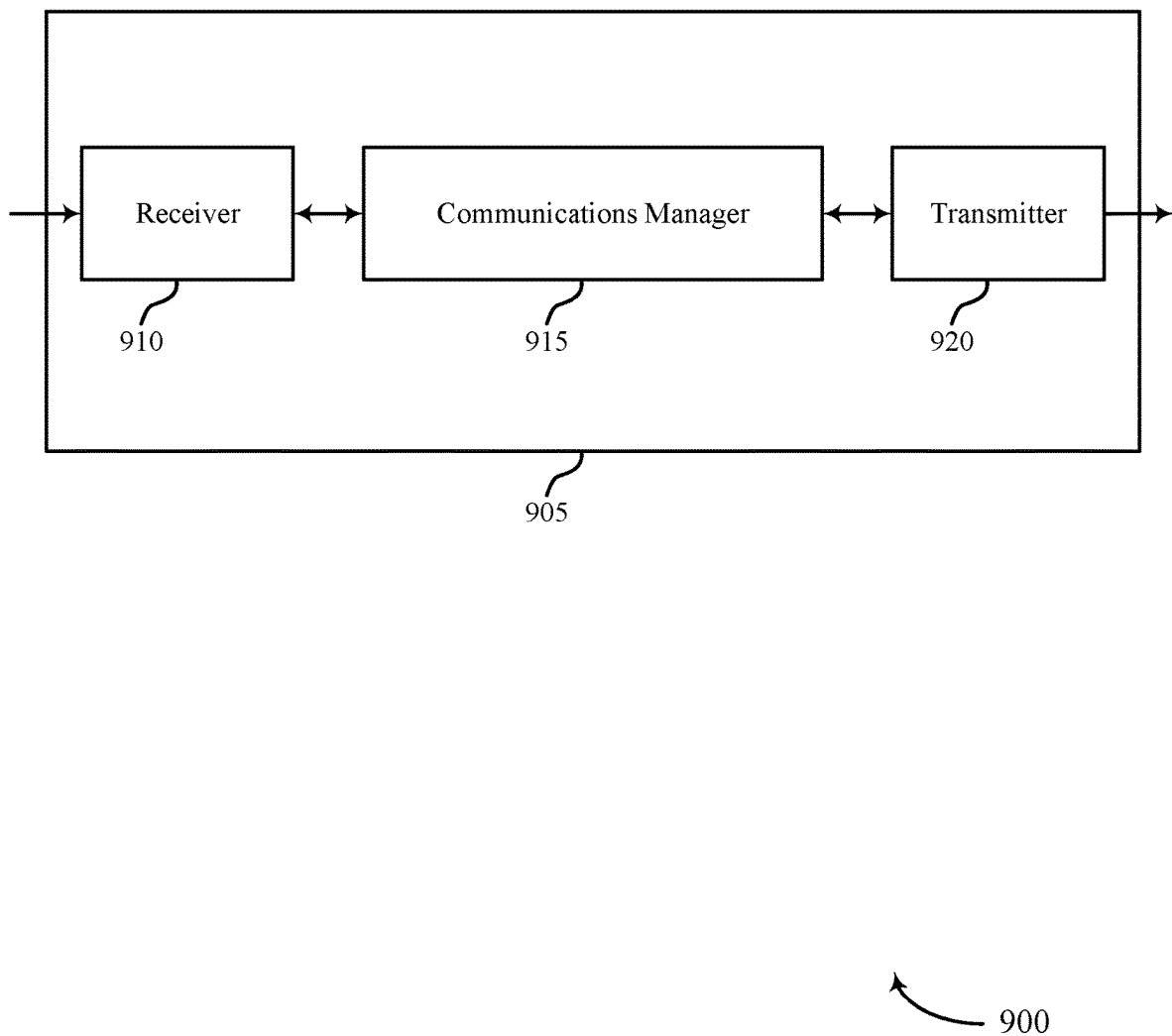
FIGS. 9 and 10 show block diagrams of devices that support procedures for managing quality of service flows in accordance with aspects of the present disclosure.

FIG. 9 shows a block diagram 900 of a device 905 that supports procedures for managing quality of service flows in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to procedures for managing quality of service flows). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE, a buffer status report including a buffer status of a first quality of service flow associated with uplink data available for transmission at the UE, transmit, to the UE, an uplink grant based on receiving the buffer status report, and receive the uplink data based on the uplink grant. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
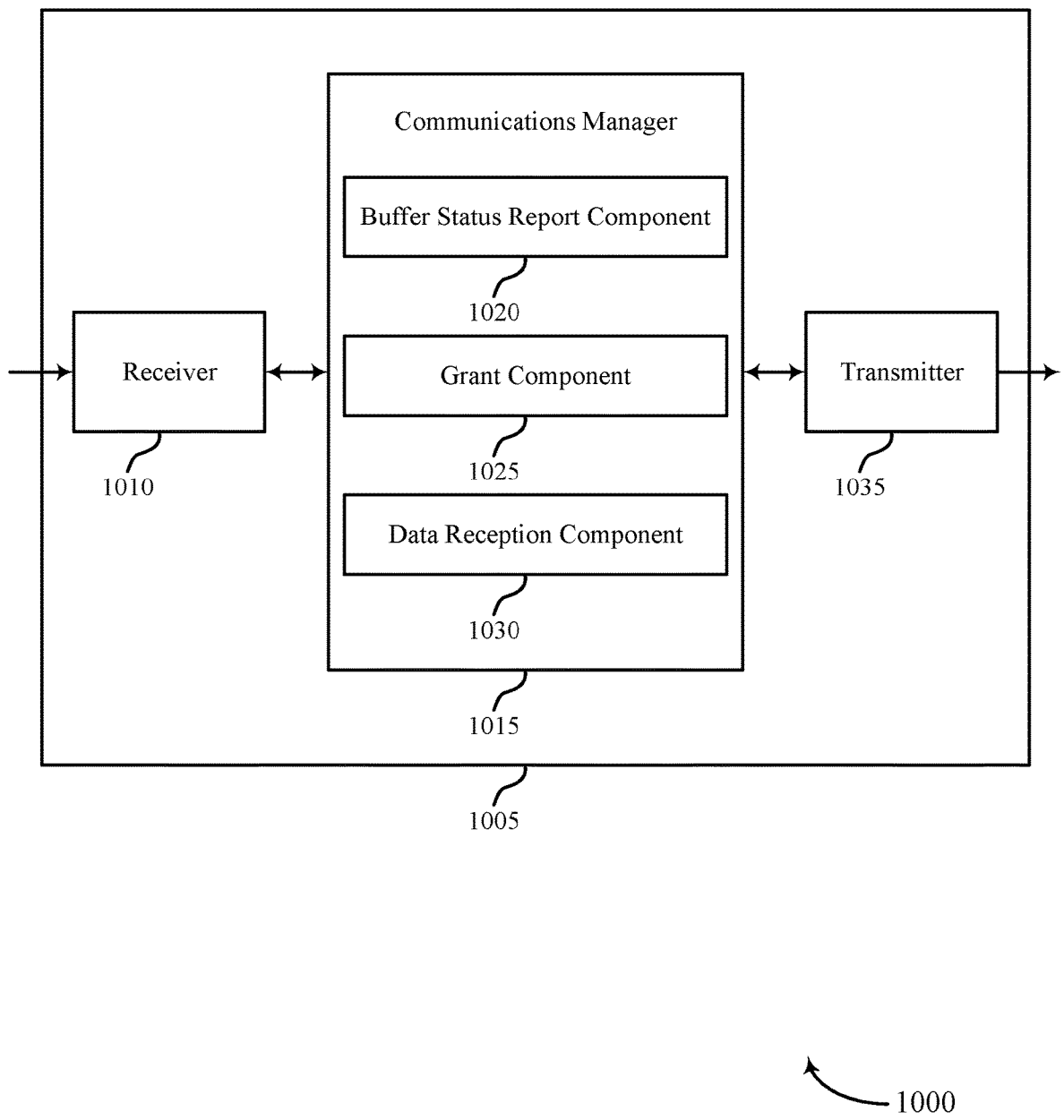

FIG. 10 shows a block diagram 1000 of a device 1005 that supports procedures for managing quality of service flows in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to procedures for managing quality of service flows). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a buffer status report component 1020, a grant component 1025, and a data reception component 1030. The communications manager 1015 may be an example of aspects of the communications manager 1210 described herein.

The buffer status report component 1020 may receive, from a UE, a buffer status report including a buffer status of a first quality of service flow associated with uplink data available for transmission at the UE. The grant component 1025 may transmit, to the UE, an uplink grant based on receiving the buffer status report. The data reception component 1030 may receive the uplink data based on the uplink grant.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
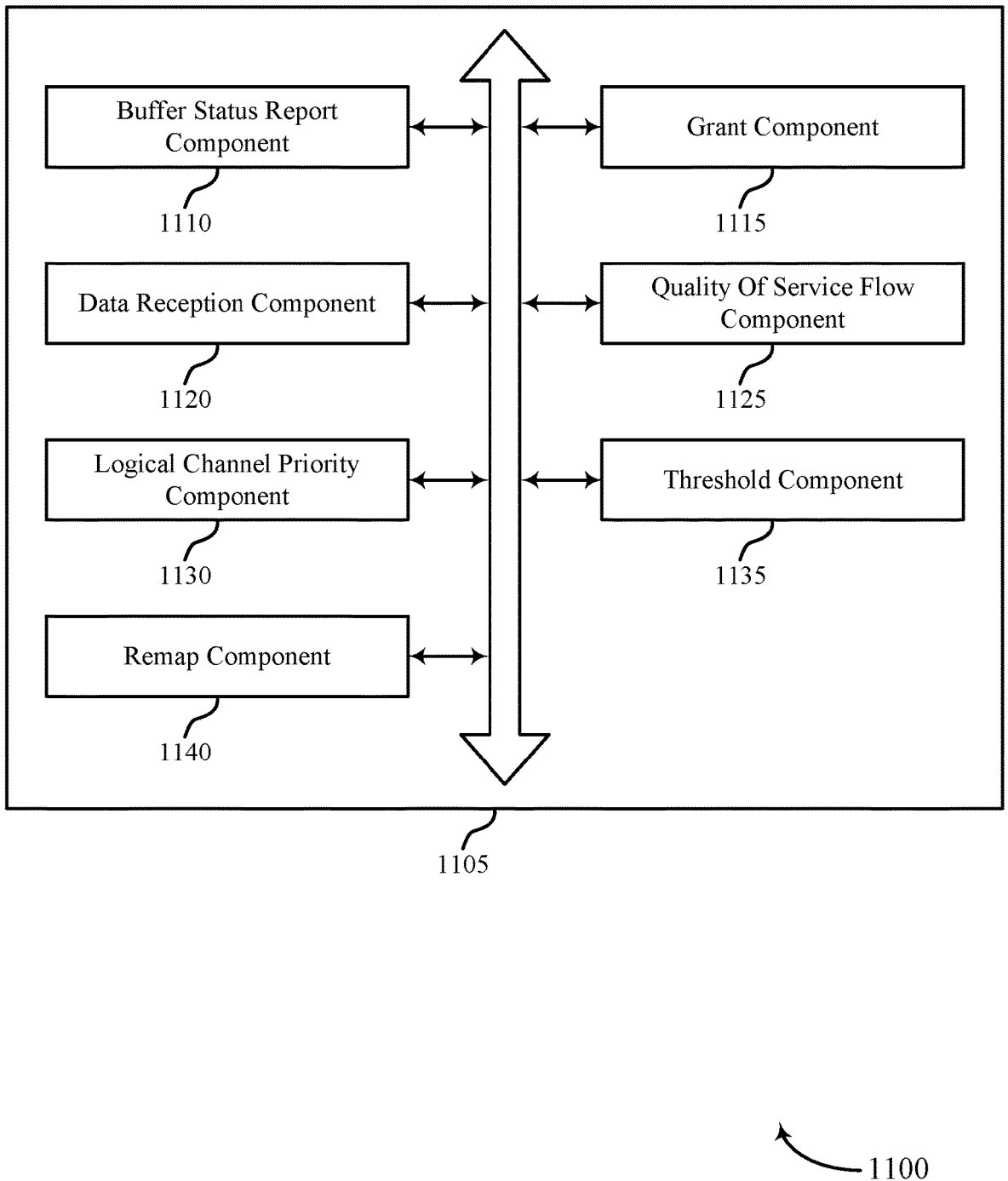
FIG. 11 shows a block diagram of a communications manager that supports procedures for managing quality of service flows in accordance with aspects of the present disclosure.

FIG. 11 shows a block diagram 1100 of a communications manager 1105 that supports procedures for managing quality of service flows in accordance with aspects of the present disclosure. The communications manager 1105 may be an example of aspects of a communications manager 915, a communications manager 1015, or a communications manager 1210 described herein. The communications manager 1105 may include a buffer status report component 1110, a grant component 1115, a data reception component 1120, a quality of service flow component 1125, a logical channel priority component 1130, a threshold component 1135, and a remap component 1140. Each of these modules may communicate, directly or indirectly, with one another (e.g., via one or more buses).

The buffer status report component 1110 may receive, from a UE, a buffer status report including a buffer status of a first quality of service flow associated with uplink data available for transmission at the UE. The grant component 1115 may transmit, to the UE, an uplink grant based on receiving the buffer status report. The data reception component 1120 may receive the uplink data based on the uplink grant.

The quality of service flow component 1125 may configure the UE to determine that the first quality of service flow is associated with a buffer that is empty other than the determined uplink data, where the first quality of service flow is associated with a first logical channel priority. The logical channel priority component 1130 may configure the UE to determine a second logical channel priority associated with a second quality of service flow. In some examples, the buffer status report component 1110 may configure the UE to transmit the buffer status report based on a comparison of the first logical channel priority with the second logical channel priority. In some cases, the second quality of service flow includes buffered data.

In some examples, the buffer status report component 1110 may configure the UE to transmit the buffer status report including the buffer status of the first quality of service flow is based on determining that a second quality of service flow is devoid of buffered data. In some examples, the buffer status report component 1110 may configure the UE to transmit the buffer status report including the buffer status of the first quality of service flow is based on determining that that a timer has elapsed since transmission of a prior buffer status report.

In some examples, the buffer status report component 1110 may configure the UE to transmit the buffer status report including the buffer status of the first quality of service flow based on the determining that the first quality of service flow associated with the uplink data satisfies one or more thresholds.

The threshold component 1135 may transmit, to the UE, a signal indicating the one or more thresholds for triggering the buffer status report. In some cases, the signal indicating one or more thresholds includes at least one of a MAC control element, a radio resource control message, or a service data adaptation protocol data unit.

The remap component 1140 may configure the UE to remap the first quality of service flow to a logical channel based on the determining that the first quality of service flow associated with the uplink data satisfies a threshold.

Figure 12:
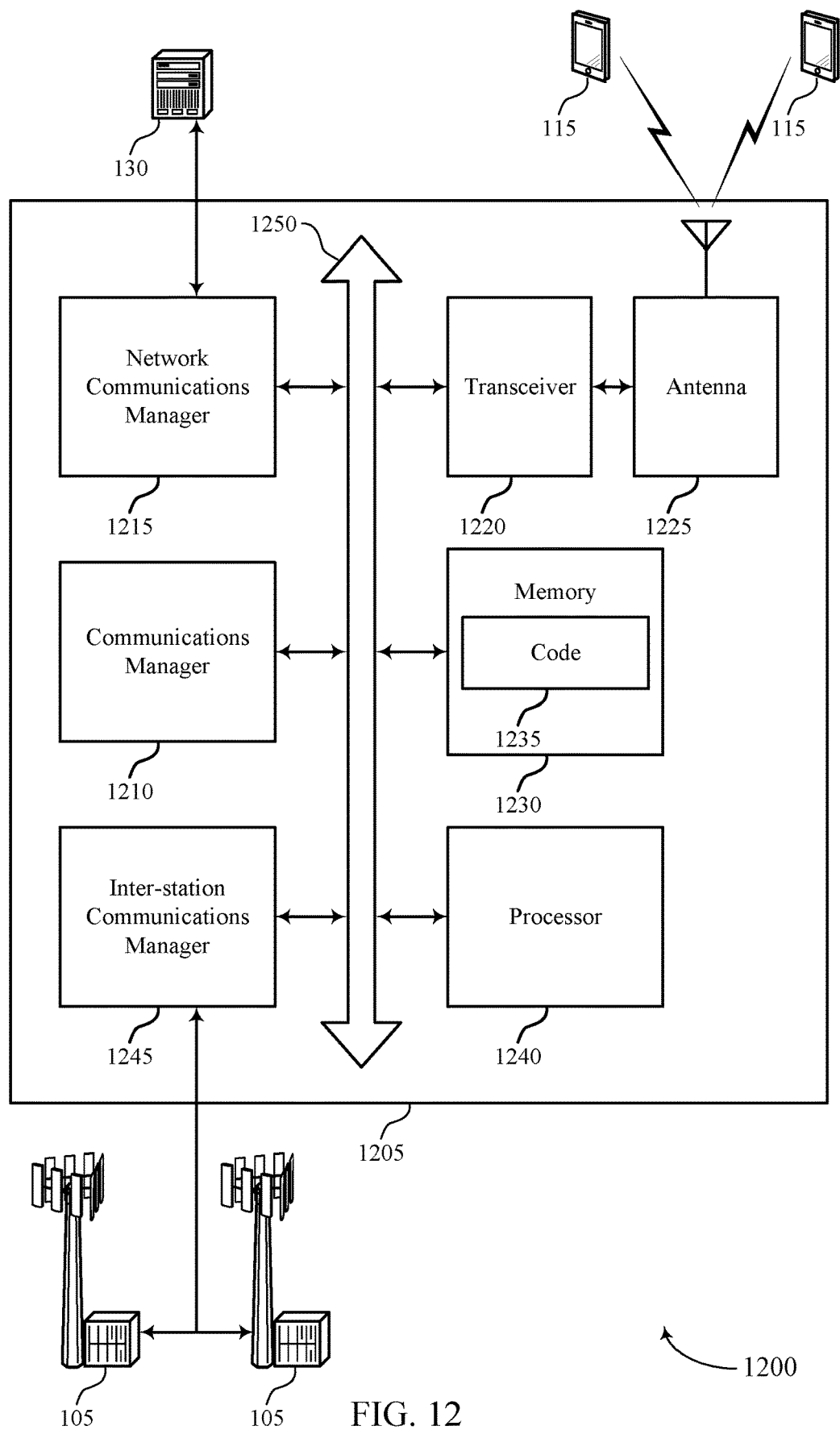
FIG. 12 shows a diagram of a system including a device that supports procedures for managing quality of service flows in accordance with aspects of the present disclosure.

FIG. 12 shows a diagram of a system 1200 including a device 1205 that supports procedures for managing quality of service flows in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE, a buffer status report including a buffer status of a first quality of service flow associated with uplink data available for transmission at the UE, transmit, to the UE, an uplink grant based on receiving the buffer status report, and receive the uplink data based on the uplink grant.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases, the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting procedures for managing quality of service flows).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
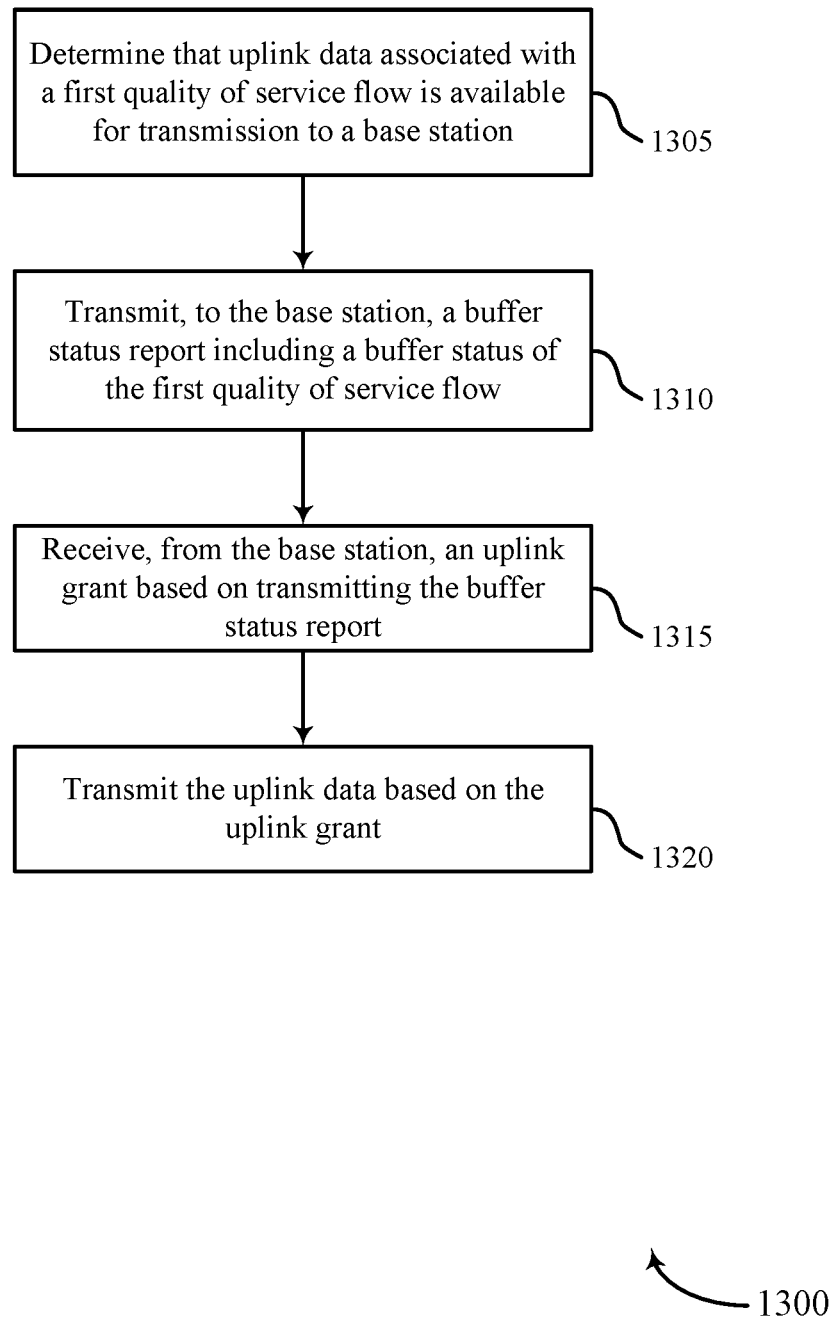
FIGS. 13 through 16 show flowcharts illustrating methods that support procedures for managing quality of service flows in accordance with aspects of the present disclosure.

FIG. 13 shows a flowchart illustrating a method 1300 that supports procedures for managing quality of service flows in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may determine that uplink data associated with a first quality of service flow is available for transmission to a base station. The operations of 1305 may be performed according to the methods described herein. In some examples, aspects of the operations of 1305 may be performed by a data availability determination component as described with reference to FIGS. 5 through 8.

At 1310, the UE may transmit, to the base station, a buffer status report including a buffer status of the first quality of service flow. The operations of 1310 may be performed according to the methods described herein. In some examples, aspects of the operations of 1310 may be performed by a buffer status report component as described with reference to FIGS. 5 through 8.

At 1315, the UE may receive, from the base station, an uplink grant based on transmitting the buffer status report. The operations of 1315 may be performed according to the methods described herein. In some examples, aspects of the operations of 1315 may be performed by a grant component as described with reference to FIGS. 5 through 8.

At 1320, the UE may transmit the uplink data based on the uplink grant. The operations of 1320 may be performed according to the methods described herein. In some examples, aspects of the operations of 1320 may be performed by a data transmission component as described with reference to FIGS. 5 through 8.

Figure 14:
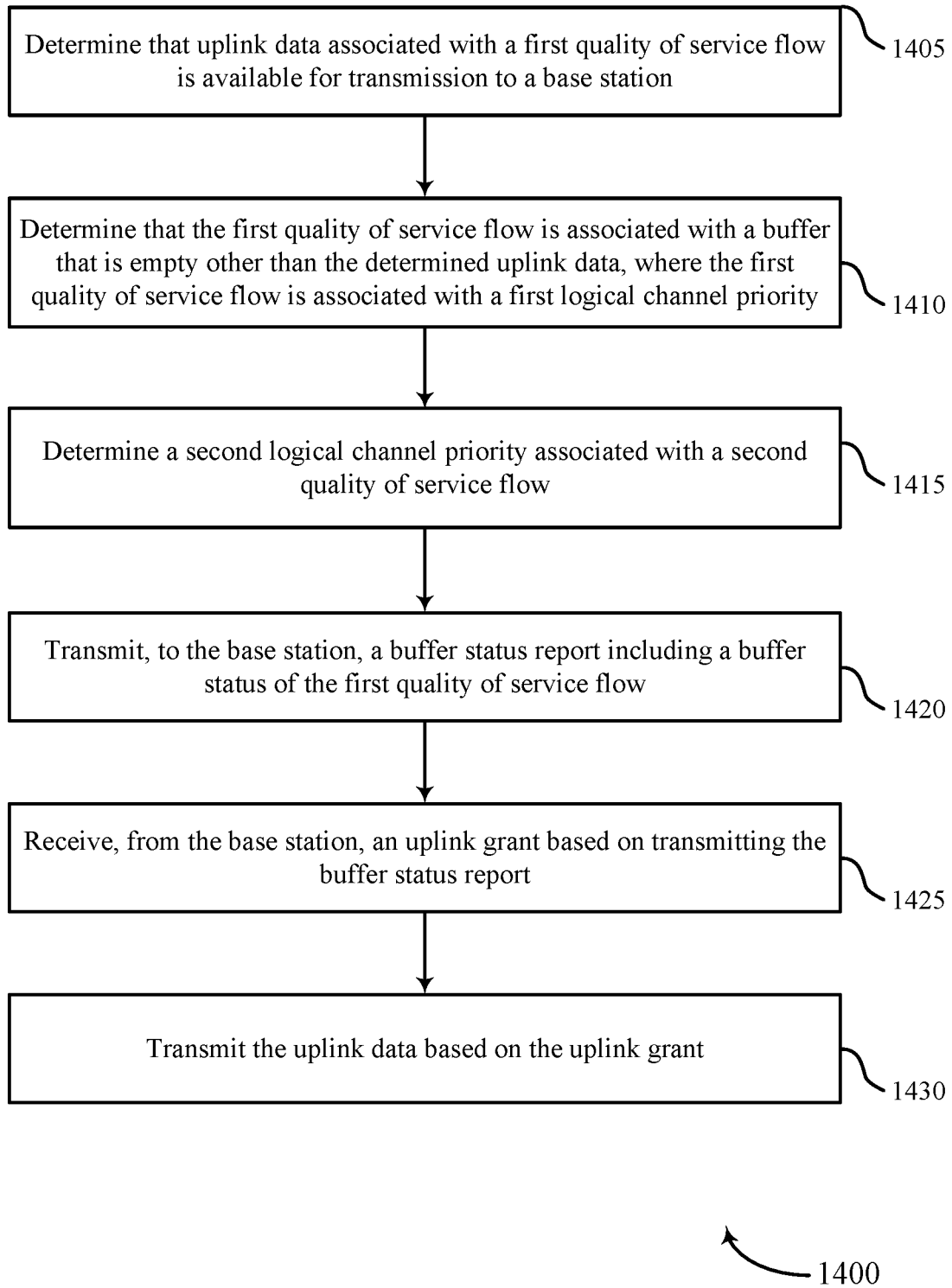

FIG. 14 shows a flowchart illustrating a method 1400 that supports procedures for managing quality of service flows in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may determine that uplink data associated with a first quality of service flow is available for transmission to a base station. The operations of 1405 may be performed according to the methods described herein. In some examples, aspects of the operations of 1405 may be performed by a data availability determination component as described with reference to FIGS. 5 through 8.

At 1410, the UE may determine that the first quality of service flow is associated with a buffer that is empty other than the determined uplink data, where the first quality of service flow is associated with a first logical channel priority. The operations of 1410 may be performed according to the methods described herein. In some examples, aspects of the operations of 1410 may be performed by a quality of service flow component as described with reference to FIGS. 5 through 8.

At 1415, the UE may determine a second logical channel priority associated with a second quality of service flow. The operations of 1415 may be performed according to the methods described herein. In some examples, aspects of the operations of 1415 may be performed by a logical channel priority component as described with reference to FIGS. 5 through 8.

At 1420, the UE may transmit, to the base station, a buffer status report including a buffer status of the first quality of service flow. In some cases, transmitting the buffer status report including the buffer status of the first quality of service flow is based on a comparison of the first logical channel priority with the second logical channel priority. The operations of 1420 may be performed according to the methods described herein. In some examples, aspects of the operations of 1420 may be performed by a buffer status report component as described with reference to FIGS. 5 through 8.

At 1425, the UE may receive, from the base station, an uplink grant based on transmitting the buffer status report. The operations of 1425 may be performed according to the methods described herein. In some examples, aspects of the operations of 1425 may be performed by a grant component as described with reference to FIGS. 5 through 8.

At 1430, the UE may transmit the uplink data based on the uplink grant. The operations of 1430 may be performed according to the methods described herein. In some examples, aspects of the operations of 1430 may be performed by a data transmission component as described with reference to FIGS. 5 through 8.

Figure 15:
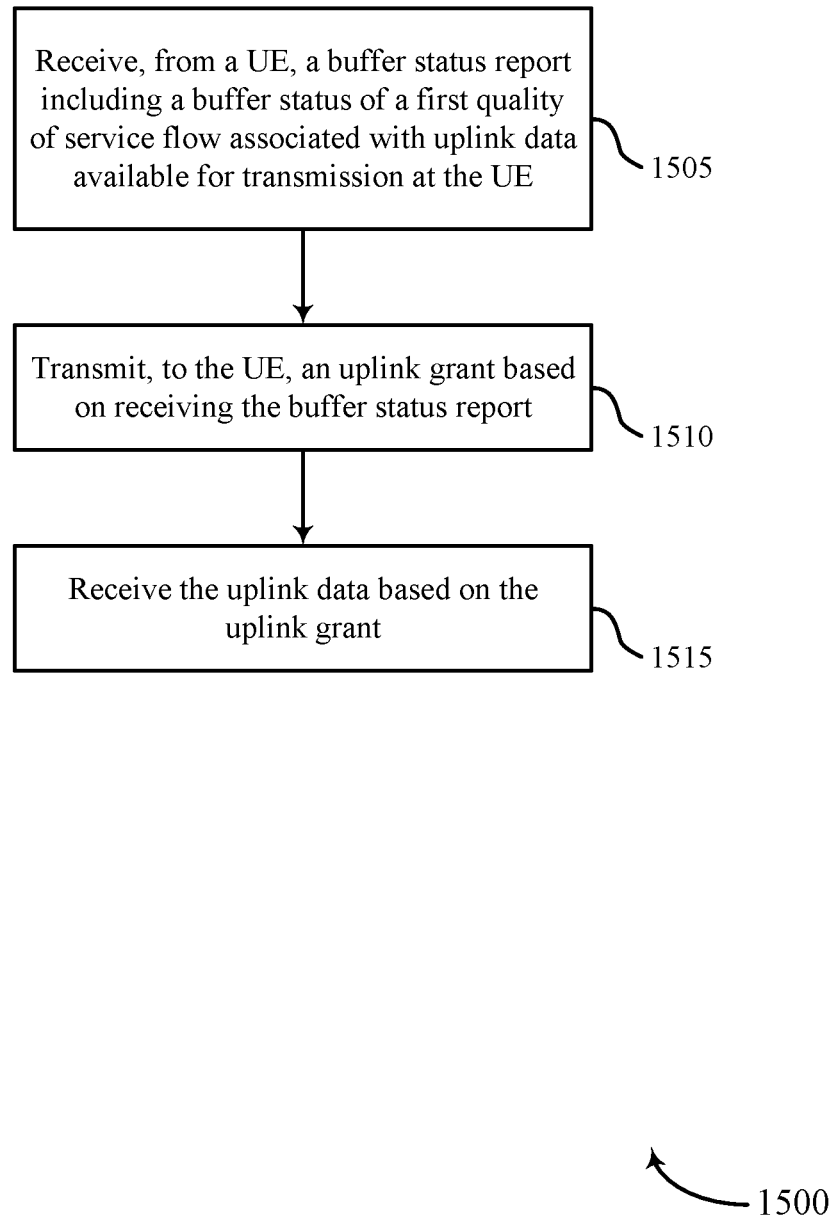

FIG. 15 shows a flowchart illustrating a method 1500 that supports procedures for managing quality of service flows in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may receive, from a UE, a buffer status report including a buffer status of a first quality of service flow associated with uplink data available for transmission at the UE. The operations of 1505 may be performed according to the methods described herein. In some examples, aspects of the operations of 1505 may be performed by a buffer status report component as described with reference to FIGS. 9 through 12.

At 1510, the base station may transmit, to the UE, an uplink grant based on receiving the buffer status report. The operations of 1510 may be performed according to the methods described herein. In some examples, aspects of the operations of 1510 may be performed by a grant component as described with reference to FIGS. 9 through 12.

At 1515, the base station may receive the uplink data based on the uplink grant. The operations of 1515 may be performed according to the methods described herein. In some examples, aspects of the operations of 1515 may be performed by a data reception component as described with reference to FIGS. 9 through 12.

Figure 16:
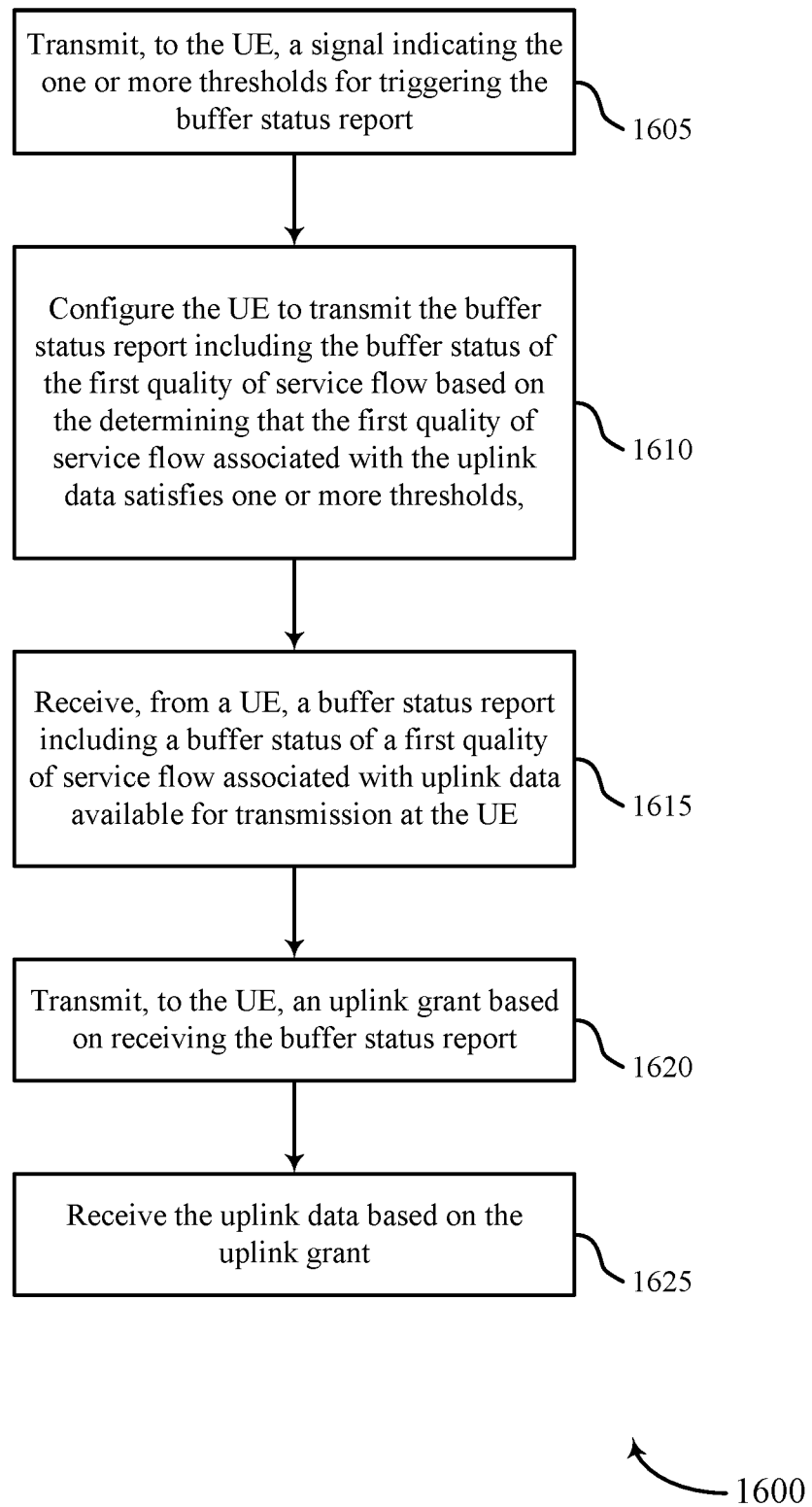

FIG. 16 shows a flowchart illustrating a method 1600 that supports procedures for managing quality of service flows in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may transmit, to the UE, a signal indicating the one or more thresholds for triggering the buffer status report. The operations of 1605 may be performed according to the methods described herein. In some examples, aspects of the operations of 1605 may be performed by a threshold component as described with reference to FIGS. 9 through 12.

At 1610, the base station may configure the UE to transmit the buffer status report including the buffer status of the first quality of service flow based on the determining that the first quality of service flow associated with the uplink data satisfies one or more thresholds. The operations of 1610 may be performed according to the methods described herein. In some examples, aspects of the operations of 1610 may be performed by a buffer status report component as described with reference to FIGS. 9 through 12.

At 1615, the base station may receive, from a UE, a buffer status report including a buffer status of a first quality of service flow associated with uplink data available for transmission at the UE. The operations of 1615 may be performed according to the methods described herein. In some examples, aspects of the operations of 1615 may be performed by a buffer status report component as described with reference to FIGS. 9 through 12.

At 1620, the base station may transmit, to the UE, an uplink grant based on receiving the buffer status report. The operations of 1620 may be performed according to the methods described herein. In some examples, aspects of the operations of 1620 may be performed by a grant component as described with reference to FIGS. 9 through 12.

At 1625, the base station may receive the uplink data based on the uplink grant. The operations of 1625 may be performed according to the methods described herein. In some examples, aspects of the operations of 1625 may be performed by a data reception component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, or unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting, to a network device, a buffer status report comprising a buffer status of a first quality of service flow associated with a first logical channel priority, wherein the transmitting is based at least in part on uplink data associated with the first quality of service flow being available for transmission to the network device and a difference between the first quality of service flow and a second quality of service flow associated with a second logical channel priority;
    receiving, from the network device, an uplink grant based at least in part on transmitting the buffer status report; and
    transmitting the uplink data based at least in part on the uplink grant.

2. The method of claim 1, further comprising:
  determining that the first quality of service flow is associated with a buffer that is empty other than the uplink data; and
  determining the second logical channel priority associated with the second quality of service flow, wherein transmitting the buffer status report comprising the buffer status of the first quality of service flow is based at least in part on a comparison of the first logical channel priority with the second logical channel priority.

3. The method of claim 2, wherein the second quality of service flow includes buffered data.

4. The method of claim 1, further comprising:
  determining that the second quality of service flow is devoid of buffered data, wherein transmitting the buffer status report comprising the buffer status of the first quality of service flow is based at least in part on the determining.

5. The method of claim 1, further comprising:
  determining that a timer has elapsed since transmission of a prior buffer status report, wherein transmitting the buffer status report comprising the buffer status of the first quality of service flow is based at least in part on the determining.

6. The method of claim 1, further comprising:
  determining that the first quality of service flow associated with the uplink data satisfies one or more thresholds, wherein transmitting the buffer status report comprising the buffer status of the first quality of service flow is based at least in part on the determining.

7. The method of claim 6, further comprising:
  determining that at least a portion of the uplink data has been buffered for more than a threshold time period; and
  transmitting the buffer status report comprising the buffer status of the first quality of service flow based at least in part on determining that at least the portion of the uplink data has been buffered for more than the threshold time period.

8. The method of claim 7, wherein the first quality of service flow is associated with a delay requirement.

9. The method of claim 6, further comprising:
  determining, based at least in part on a moving-average, a bit rate associated with the first quality of service flow;
  determining that a difference between the determined bit rate and a predetermined bit rate satisfies a threshold bit rate; and
  transmitting the buffer status report comprising the buffer status of the first quality of service flow based at least in part on determining that the difference satisfies the threshold bit rate.

10. The method of claim 6, further comprising:
  determining, for a number of consecutive measurement intervals and based at least in part on a moving-average, a bit rate associated with the first quality of service flow;
  determining, for each of the number of consecutive measurement intervals, that a difference between the determined bit rate and a predetermined bit rate satisfies a threshold bit rate; and
  transmitting the buffer status report comprising the buffer status of the first quality of service flow based at least in part on determining that the difference satisfies the threshold bit rate for each of the number of consecutive measurement intervals.

11. The method of claim 6, further comprising:
  receiving, from the network device, a signal indicating the one or more thresholds for triggering the buffer status report.

12. The method of claim 11, wherein the signal indicating the one or more thresholds comprises at least one of a medium access control (MAC) control element, a radio resource control message, or a service data adaptation protocol data unit.

13. The method of claim 1, further comprising:
  determining that the first quality of service flow associated with the uplink data satisfies a threshold; and
  remapping the first quality of service flow to a logical channel based at least in part on the determining.

14. The method of claim 13, further comprising:
  determining that at least a portion of the uplink data has been buffered for more than a threshold time period; and
  remapping the first quality of service flow to the logical channel based at least in part on determining that at least the portion of the uplink data has been buffered for more than the threshold time period.

15. The method of claim 13, further comprising:
  determining, based at least in part on a moving-average, a bit rate associated with the first quality of service flow;
  determining that a difference between the determined bit rate and a predetermined bit rate satisfies a threshold bit rate; and
  remapping the first quality of service flow to the logical channel based at least in part on determining that the difference satisfies the threshold bit rate.

16. The method of claim 13, further comprising:
  determining, for a number of consecutive measurement intervals and based at least in part on a moving-average, a bit rate associated with the first quality of service flow;
  determining, for each of the number of consecutive measurement intervals, that a difference between the determined bit rate and a predetermined bit rate satisfies a threshold bit rate; and
  remapping the first quality of service flow to the logical channel based at least in part on determining that the difference satisfies the threshold bit rate for each of the number of consecutive measurement intervals.

17. A method for wireless communication at a network device, comprising:
  receiving, from a user equipment (UE), a buffer status report comprising a buffer status of a first quality of service flow associated with a first logical channel priority, wherein the receiving is based at least in part on uplink data associated with the first quality of service flow being available for transmission at the UE and a difference between the first quality of service flow and a second quality of service flow associated with a second logical channel priority;
  transmitting, to the UE, an uplink grant based at least in part on receiving the buffer status report; and
  receiving the uplink data based at least in part on the uplink grant.

18. The method of claim 17, further comprising:
  configuring the UE to determine that the first quality of service flow is associated with a buffer that is empty other than the uplink data;
  configuring the UE to determine the second logical channel priority associated with the second quality of service flow; and configuring the UE to transmit the buffer status report based at least in part on a comparison of the first logical channel priority with the second logical channel priority.

19. The method of claim 18, wherein the second quality of service flow includes buffered data.

20. The method of claim 17, further comprising:
configuring the UE to transmit the buffer status report comprising the buffer status of the first quality of service flow is based at least in part on determining that the second quality of service flow is devoid of buffered data.

21. The method of claim 17, further comprising:
configuring the UE to transmit the buffer status report comprising the buffer status of the first quality of service flow is based at least in part on determining that a timer has elapsed since transmission of a prior buffer status report.

22. The method of claim 17, further comprising:
configuring the UE to transmit the buffer status report comprising the buffer status of the first quality of service flow is based at least in part on determining that the first quality of service flow associated with the uplink data satisfies one or more thresholds.

23. The method of claim 22, further comprising:
transmitting, to the UE, a signal indicating the one or more thresholds for triggering the buffer status report.

24. The method of claim 23, wherein the signal indicating the one or more thresholds comprises at least one of a medium access control (MAC) control element, a radio resource control message, or a service data adaptation protocol data unit.

25. The method of claim 17, further comprising:
configuring the UE to remap the first quality of service flow to a logical channel based at least in part on determining that the first quality of service flow associated with the uplink data satisfies a threshold.

26. An apparatus for wireless communication at a user equipment (UE), comprising:
a processor,
memory coupled with the processor; and
instructions stored in the memory and executable by the processor to cause the apparatus to:
transmit, to a network device, a buffer status report comprising a buffer status of a first quality of service flow associated with a first logical channel priority, wherein the transmitting is based at least in part on uplink data associated with the first quality of service flow being available for transmission to the network device and a difference between the first quality of service flow and a second quality of service flow associated with a second logical channel priority;
receive, from the network device, an uplink grant based at least in part on transmitting the buffer status report; and
transmit the uplink data based at least in part on the uplink grant.

27. The apparatus of claim 26, wherein the instructions are further executable by the processor to cause the apparatus to:
determine that the first quality of service flow is associated with a buffer that is empty other than the uplink data; and
determine the second logical channel priority associated with the second quality of service flow, wherein transmitting the buffer status report comprising the buffer status of the first quality of service flow is based at least in part on a comparison of the first logical channel priority with the second logical channel priority.

28. The apparatus of claim 26, wherein the instructions are further executable by the processor to cause the apparatus to:
determine that the second quality of service flow is devoid of buffered data, wherein transmitting the buffer status report comprising the buffer status of the first quality of service flow is based at least in part on the determining.

29. An apparatus for wireless communication at a network device, comprising:
a processor,
memory coupled with the processor; and
instructions stored in the memory and executable by the processor to cause the apparatus to:
receive, from a user equipment (UE), a buffer status report comprising a buffer status of a first quality of service flow associated with a first logical channel priority, wherein the receiving is based at least in part on uplink data associated with the first quality of service flow being available for transmission at the UE and a difference between the first quality of service flow and a second quality of service flow associated with a second logical channel priority;
transmit, to the UE, an uplink grant based at least in part on receiving the buffer status report; and
receive the uplink data based at least in part on the uplink grant.

30. The apparatus of claim 29, wherein the instructions are further executable by the processor to cause the apparatus to:
configure the UE to determine that the first quality of service flow is associated with a buffer that is empty other than the uplink data;
configure the UE to determine the second logical channel priority associated with the second quality of service flow; and
configure the UE to transmit the buffer status report based at least in part on a comparison of the first logical channel priority with the second logical channel priority.

* * * * *